(12) United States Patent
Pan et al.

(10) Patent No.: US 12,389,014 B2
(45) Date of Patent: Aug. 12, 2025

(54) VIDEO ENCODING AND DECODING METHODS AND APPARATUSES

(71) Applicant: HANGZHOU HIKVISION DIGITAL TECHNOLOGY CO., LTD., Hangzhou (CN)

(72) Inventors: Dongping Pan, Hangzhou (CN); Yucheng Sun, Hangzhou (CN); Fangdong Chen, Hangzhou (CN); Xiaoqiang Cao, Hangzhou (CN); Liang Wei, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/709,105

(22) PCT Filed: Nov. 9, 2022

(86) PCT No.: PCT/CN2022/130954
§ 371 (c)(1),
(2) Date: Jul. 8, 2024

(87) PCT Pub. No.: WO2023/083225
PCT Pub. Date: May 19, 2023

(65) Prior Publication Data
US 2025/0008119 A1    Jan. 2, 2025

(30) Foreign Application Priority Data
Nov. 11, 2021 (CN) .......................... 202111333832.1

(51) Int. Cl.
| | |
|---|---|
| *H04N 19/174* | (2014.01) |
| *H04N 19/103* | (2014.01) |
| *H04N 19/129* | (2014.01) |
| *H04N 19/136* | (2014.01) |
| *H04N 19/176* | (2014.01) |

(52) U.S. Cl.
CPC ......... *H04N 19/174* (2014.11); *H04N 19/103* (2014.11); *H04N 19/129* (2014.11); *H04N 19/136* (2014.11); *H04N 19/176* (2014.11)

(58) Field of Classification Search
CPC .. H04N 19/174; H04N 19/103; H04N 19/129; H04N 19/136; H04N 19/176;
(Continued)

(56) References Cited

U.S. PATENT DOCUMENTS

| | | |
|---|---|---|
| 2015/0358621 A1 | 12/2015 | He et al. |
| 2019/0313102 A1 | 10/2019 | Cho et al. |

(Continued)

FOREIGN PATENT DOCUMENTS

| | | |
|---|---|---|
| CN | 101389021 A | 3/2009 |
| CN | 104093020 A | 10/2014 |

(Continued)

OTHER PUBLICATIONS

Notice of Allowances in Chinese Appln. No. 202310492992.3, mailed on Sep. 6, 2024, 8 pages (with English translation).

(Continued)

*Primary Examiner* — Nam D Pham
(74) *Attorney, Agent, or Firm* — Fish & Richardson P.C.

(57) ABSTRACT

The present application provides a video encoding/decoding method and apparatus. The method includes: obtaining, by a decoding end, a code stream of a unit to be decoded; determining a scanning manner and a grouping manner of the unit to be decoded, and an coding manner corresponding to each group; decoding according to the coding manner of each group to obtain one or more coefficient blocks corresponding to the unit to be decoded; and recovering one or more coefficients in each of the coefficient blocks in each group one by one according to the scanning manner of the (Continued)

unit to be decoded to obtain one or more reconstructed data blocks corresponding to the unit to be decoded.

8 Claims, 5 Drawing Sheets

(58) Field of Classification Search
CPC ........ H04N 19/13; H04N 19/18; H04N 19/91; H04N 19/44; H04N 19/119; H04N 19/124; H04N 19/60
See application file for complete search history.

(56) References Cited

U.S. PATENT DOCUMENTS

2021/0029360 A1* 1/2021 Haase ................ H04N 19/129
2021/0168369 A1  6/2021 Li

FOREIGN PATENT DOCUMENTS

| | | |
|---|---|---|
| CN | 105812803 | 7/2016 |
| CN | 106105040 A | 11/2016 |
| CN | 110650343 | 1/2020 |
| CN | 113170135 | 7/2021 |
| WO | WO 2020117716 | 6/2020 |

OTHER PUBLICATIONS

International Search Report in International Appln. No. PCT/CN2022/130954, mailed on Feb. 8, 2023, 4 pages (with English translation).
International Written Opinion in International Appln. No. PCT/CN2022/130954, mailed on Feb. 8, 2023, 5 pages (with English Machine/Partial translation).

* cited by examiner

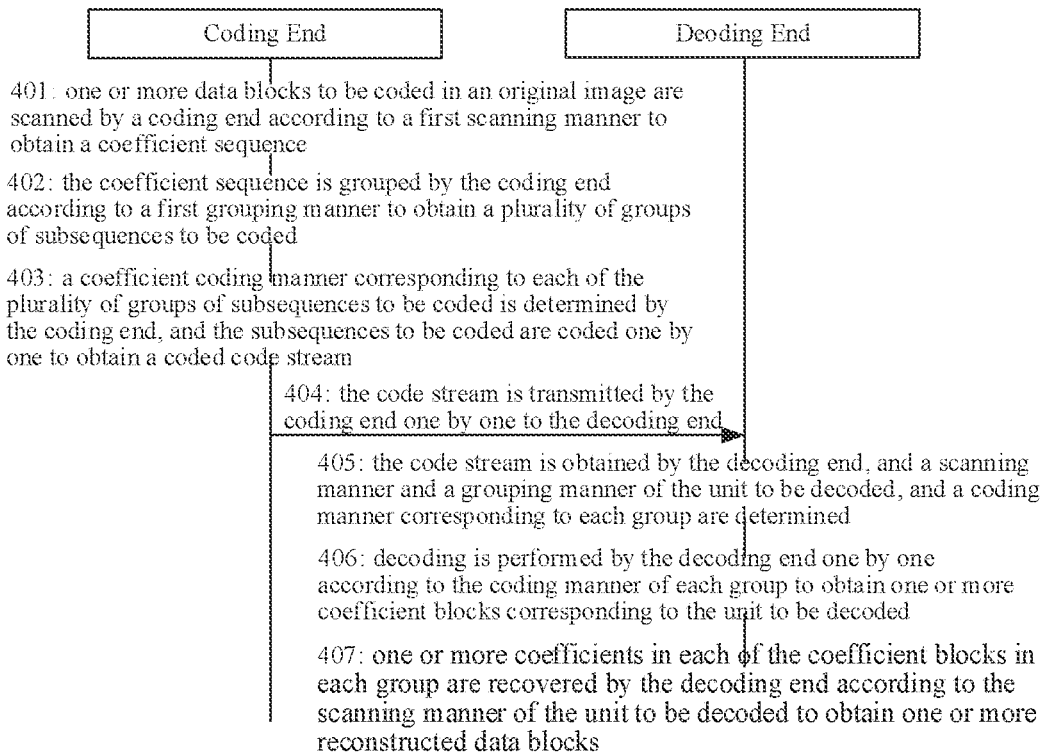
FIG. 4B
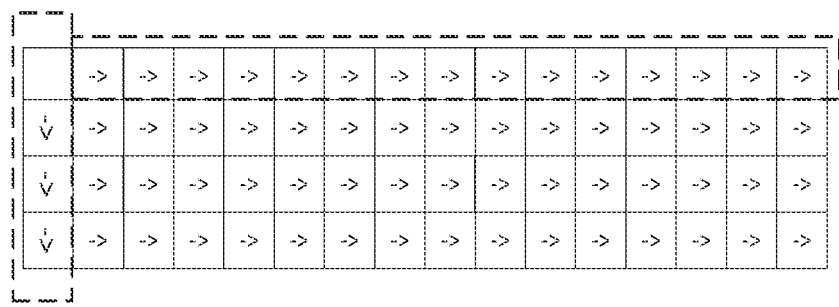
FIG. 5
FIG. 6

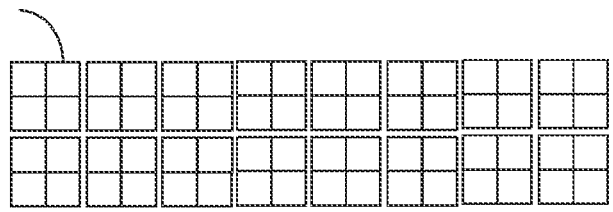
FIG. 7
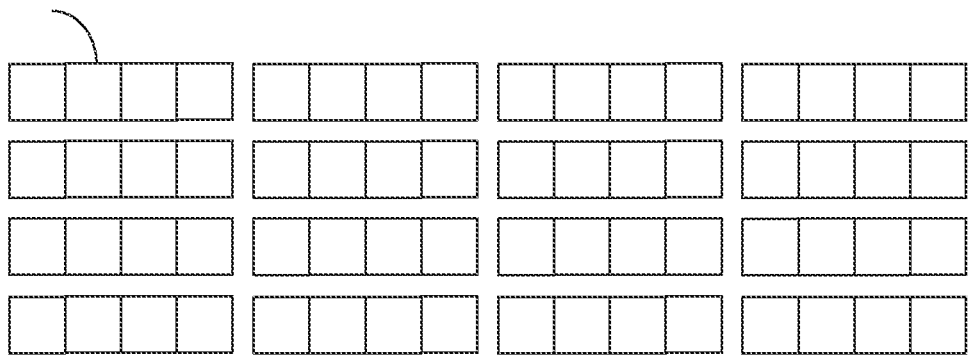
FIG. 8
FIG. 9

VIDEO ENCODING AND DECODING METHODS AND APPARATUSES

CROSS REFERENCE TO RELATED APPLICATIONS

This application is a U.S. National Stage of International Application No. PCT/CN2022/130954, filed on Nov. 9, 2022, which claims priority to Chinese Patent Applications No. 202111333832.1, filed on Nov. 11, 2021, the disclosure of which is incorporated herein by reference in its entirety for all purposes.

TECHNICAL FIELD

The present disclosure relates to the field of image processing technologies, and in particular to a video coding and decoding method and apparatus.

BACKGROUND

In the field of computer vision, in order to effectively store and transmit videos, it is usually necessary to compress images through video coding, which mainly includes lossy compression and lossless compression. Lossless compression utilizes statistical redundancy of image data for image compression, which can fully restore original image data without causing any distortion. In addition, if there is an error between a reconstructed image and an original image, and the error is limited in a certain range, it is referred to as near lossless compression. Although there is some distortion in near lossless compression, it can be ignored for visual images, and thus near lossless compression can also be considered as lossless compression.

In current lossless compression (including near lossless compression) coding and decoding solutions, for example, context-based adaptive binary arithmetic coding (CABAC) compression technologies involve many probability models, context modeling, binary arithmetic coding and other algorithms, and the processing process is relatively complicated. In addition, Golomb-Rice coding based on Golomb coding has redundant calculation in the encoding process, and the coding and decoding performance is not high. Therefore, it is urgent to propose a video coding and decoding method with relatively high coding and decoding efficiency and relatively low algorithm complexity.

SUMMARY

The present disclosure provides a video coding and decoding method and apparatus, which solve problems of relatively low video coding and decoding performance or relatively high coding and decoding algorithm complexity in the related art.

In order to achieve the above purposes, the present disclosure adopts the following technical solutions.

In a first aspect, there is provided a video image decoding method, including: obtaining, by a decoding end, a code stream of a unit to be decoded; determining a scanning manner and a grouping manner of the unit to be decoded, and a coding manner corresponding to each group; decoding according to the coding manner of each group to obtain one or more coefficient blocks corresponding to the unit to be decoded; and recovering one or more coefficients in each of the coefficient blocks in each group one by one according to the scanning manner of the unit to be decoded to obtain one or more reconstructed data blocks corresponding to the unit to be decoded.

In an implementation, the grouping manner includes at least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, the scanning manner includes vertical scanning.

In an implementation, each of the reconstructed data blocks is a data block including one of original pixel values of an image to be decoded, residual values obtained by predicting the original pixel values, coefficients obtained by quantizing the residual values, or transform coefficients obtained by transforming the residual values.

In an implementation, each of the reconstructed data blocks is a data block composed of one of original pixel values of an image to be decoded, residual values obtained by predicting the original pixel values, or coefficients obtained by quantizing the residual values.

In an implementation, determining the scanning manner and the grouping manner of the unit to be decoded, and the coding manner corresponding to each group includes: determining at least one of the scanning manner and the grouping manner of the unit to be decoded and the coding manner corresponding to each group according to the pre-agreement of a coding end and the decoding end or context information, or obtaining at least one of the scanning manner and the grouping manner of the unit to be decoded and the coding manner corresponding to each group by parsing the code stream; or obtaining the grouping manner according to a prediction manner, a quantization manner and/or a transform manner of the unit to be decoded.

In an implementation, determining the scanning manner and the grouping manner of the unit to be decoded, and the coding manner corresponding to each group includes: determining at least one of the scanning manner and the grouping manner of the unit to be decoded and the coding manner corresponding to each group according to a pre-agreement of a coding end and a decoding end; or obtaining at least one of the scanning manner and the grouping manner of the unit to be decoded and the coding manner corresponding to each group by parsing the code stream, or determining a scanning manner and a grouping manner of at least one type of unit to be decoded and the coding manner corresponding to each group according to a pre-agreement of the coding end and the decoding end, and based on the scanning manner and the grouping manner of the at least one type of unit to be decoded and the coding manner corresponding to each group, obtaining at least one of the scanning manner and the grouping manner of the unit to be decoded and the coding manner corresponding to each group by parsing the code stream.

In an implementation, decoding according to the coding manner of each group to obtain one or more coefficient blocks corresponding to the unit to be decoded include:

decoding according to a coding algorithm to obtain group parameters of each group; and decoding according to the group parameters of each group by using a semi fixed-length coding algorithm to obtain a plurality of coefficient values in each group, wherein the coefficient blocks corresponding to the unit to be decoded include the plurality of coefficient values in each group.

In an implementation, decoding according to the coding algorithm to obtain the group parameters of each group includes: decoding according to at least one decoding manner corresponding to at least one of following coding manners to obtain the group parameters of each group: unary code, truncated unary code, truncated binary code, fixed-length coding, k-order exponential Golomb coding, truncated Rice coding, Huffman coding, or Golomb-Rice coding.

In an implementation, decoding according to the coding manner of each group to obtain one or more coefficient blocks corresponding to the unit to be decoded include: decoding according to a fixed-length coding algorithm to obtain group Rice parameters of each group, or obtaining the group Rice parameters of each group according to a context model; decoding according to the group Rice parameters of each group by using a Golomb-Rice coding algorithm to obtain the plurality of coefficient values in each group, wherein the coefficient blocks corresponding to the unit to be decoded include the plurality of coefficient values in each group.

In an implementation, decoding according to the coding manner of each group to obtain one or more coefficient blocks corresponding to the unit to be decoded include: obtaining group Rice parameters of each group according to a context model; decoding according to a fixed-length coding algorithm or truncated unary code to obtain a group parameter deviation of each group; obtaining the group parameters of each group according to the group Rice parameters and the group parameter deviation of each group; and decoding according to the group parameters of each group by using the Golomb-Rice coding algorithm to obtain the plurality of coefficient values in each group, wherein the coefficient blocks corresponding to the unit to be decoded include the plurality of coefficient values in each group.

In an implementation, decoding according to the coding manner of each group to obtain one or more coefficient blocks corresponding to the unit to be decoded include: decoding according to a fixed-length coding algorithm to obtain an order k of each group, or obtaining the order k of each group according to a context model; and decoding according to the order k of each group by using a k-order exponential Golomb coding algorithm to obtain a plurality of coefficient values in each group, wherein the coefficient blocks corresponding to the unit to be decoded include the plurality of coefficient values in each group.

In an implementation, decoding according to the coding manner of each group to obtain one or more coefficient blocks corresponding to the unit to be decoded include: obtaining an order k of each group according to a context model; obtaining a group parameter deviation of each group a fixed-length coding algorithm or truncated unary code; updating the order k of each group according to the group parameter deviation; and decoding according to the updated order k of each group by using a k-order exponential Golomb coding algorithm to obtain a plurality of coefficient values in each group, wherein the coefficient blocks corresponding to the unit to be decoded include the plurality of coefficient values in each group.

In an implementation, decoding according to the coding manner of each group to obtain one or more coefficient blocks corresponding to the unit to be decoded include: determining a coding manner of a current group according to at least one of the coefficients, the prediction manner, the quantization method or the transform manner of one or more groups obtained by decoding; and decoding according to a decoding manner corresponding to the coding manner of the current group to obtain the coefficients of the current group, wherein the coding manner of the current group is a combination of several coding manners such as Golomb-Rice coding, k-order exponential Golomb coding, or semi fixed-length coding.

In an implementation, among a plurality of groups of one or more coding units, two or more groups have different coding manners.

In an implementation, in response to a decoding manner of the unit to be decoded being any one of Golomb-Rice coding or k-order exponential Golomb coding, determining the grouping manner of the unit to be decoded includes: obtaining the grouping manner of the unit to be decoded according to a prediction manner, a quantization method and/or a transform manner of the unit to be decoded.

According to the above implementations of the present disclosure, the decoding end can derive different scanning manners and coefficient grouping manners according to different prediction manners, such coefficient grouping combines the prediction information, so that the grouped coefficients are more unified. For coefficients with little change, the coding end can allocate relatively small codewords for coding, and thus the coding manner is more flexible and the coding performance is improved. In addition, by designing a variety of fixed grouping modes, the method can better adapt to the semi fixed-length coding manner, and can flexibly select a better binarization method for each coding block, thereby reducing the complexity of coding algorithms.

In a second aspect, there is provided a video image decoding method, including: obtaining a code stream of a unit to be decoded; determining a scanning manner of the unit to be decoded; parsing a grouping manner of the unit to be decoded according to the code stream; decoding according to the code stream to obtain group parameters of each group; decoding according to the group parameters of each group to obtain a plurality of coefficient values in each group, where one or more coefficient blocks corresponding to the unit to be decoded include the plurality of coefficient values in each group; and recovering coefficients in the coefficient blocks corresponding to the unit to be decoded according to the scanning manner of the unit to be decoded to obtain one or more reconstructed data blocks corresponding to the unit to be decoded.

In an implementation, the scanning manner includes vertical scanning.

In an implementation, the grouping manner includes a fixed-length grouping manner or a grouping division based on coefficient arrangement positions; where the fixed-length grouping manner includes: taking the whole unit to be coded as a group or taking every four coefficients in the whole unit to be decoded as a group; the grouping division based on the coefficient arrangement positions includes: the coefficients in the whole unit to be coded being unevenly divided according to positions, or the coefficients in the whole unit to be coded being evenly divided according to positions.

In an implementation, decoding according to the code stream to obtain the group parameters of each group includes: according to sizes of the coefficient values, decoding the code stream by combining a fixed-length code with a truncated unary code to obtain the group parameters of each group.

In an implementation, decoding according to the group parameters of each group to obtain the plurality of coefficient values in each group includes: decoding according to the group parameters of each group by using a fixed-length code to obtain the plurality of coefficient values in each group.

In a third aspect, there is provided a video image coding method, including: scanning, by a coding end, one or more data blocks to be coded in an original image according to a first scanning manner to obtain a coefficient sequence; grouping the coefficient sequence according to a first grouping manner to obtain a plurality of groups of subsequences to be coded; and determining a coefficient coding manner corresponding to each of the plurality of groups of subsequences to be coded, and coding the subsequences to be coded one by one to obtain a coded code stream.

In an implementation, the grouping manner includes at least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, each of the data blocks to be coded is a data block composed of one of original pixel values of an image to be decoded, residual values obtained by predicting the original pixel values, coefficients obtained by quantizing the residual values, or transform coefficients obtained by transforming the residual values.

In a fourth aspect, there is provided a video image coding method, including: scanning one or more data blocks to be coded in an original image according to a first scanning manner to obtain a coefficient sequence; where the first scanning manner includes vertical scanning; grouping the coefficient sequence according to a first grouping manner to obtain a plurality of groups of subsequences to be coded; where the first grouping manner includes a fixed-length grouping manner or a grouping division based on coefficient arrangement positions; where the fixed-length grouping manner includes: taking the whole unit to be coded as a group or taking every four coefficients in the whole unit to be decoded as a group; the grouping division based on the coefficient arrangement positions includes: the coefficients in the whole unit to be coded being unevenly divided according to positions, or the coefficients in the whole unit to be coded being evenly divided according to positions; and determining a coefficient coding manner corresponding to each of the plurality of groups of subsequences to be coded, and coding the subsequences to be coded one by one to obtain a coded code stream.

In a fifth aspect, there is provided a video decoding apparatus, including a transceiver module and a processing module, wherein the transceiver module is configured to obtain a code stream of a unit to be decoded; and the processing module is configured to determine a scanning manner and a grouping manner of the unit to be decoded, and a coding manner corresponding to each group; decode according to the coding manner of each group to obtain one or more coefficient blocks corresponding to the unit to be decoded; and recover one or more coefficients in each of the coefficient blocks in each group one by one according to the scanning manner of the unit to be decoded to obtain one or more reconstructed data blocks corresponding to the unit to be decoded.

In an implementation, the grouping manner includes at least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, each of the reconstructed data blocks is a data block including one of original pixel values of an image to be decoded, residual values obtained by predicting the original pixel values, coefficients obtained by quantizing the residual values, or transform coefficients obtained by transforming the residual values.

In an implementation, the processing module is configured to determine at least one of the scanning manner and the grouping manner of the unit to be decoded and the coding manner corresponding to each group according to the pre-agreement of a coding end and the decoding end or context information; or obtain at least one of the scanning manner and the grouping manner of the unit to be decoded and the coding manner corresponding to each group by parsing the code stream; or obtain the grouping manner according to a prediction manner, a quantization manner and/or a transform manner of the unit to be decoded.

In an implementation, the processing module is configured to decode according to a coding algorithm to obtain group parameters of each group; and decode according to the group parameters of each group by using a semi fixed-length coding algorithm to obtain a plurality of coefficient values in each group, wherein the coefficient blocks corresponding to the unit to be decoded include the plurality of coefficient values in each group.

In an implementation, the processing module is configured to decode according to at least one decoding manner corresponding to at least one of following coding manners to obtain the group parameters of each group: unary code, truncated unary code, truncated binary code, fixed-length coding, k-order exponential Golomb coding, truncated Rice coding, Huffman coding, or Golomb-Rice coding.

In an implementation, the processing module is configured to decode according to a fixed-length coding algorithm to obtain group Rice parameters of each group, or obtain the group Rice parameters of each group according to a context model; decode according to the group Rice parameters of each group by using a Golomb-Rice coding algorithm to obtain the plurality of coefficient values in each group, wherein the coefficient blocks corresponding to the unit to be decoded include the plurality of coefficient values in each group.

In an implementation, the processing module is configured to obtain group Rice parameters of each group according to a context model; decode according to a fixed-length coding algorithm or truncated unary code to obtain a group parameter deviation of each group; obtain the group parameters of each group according to the group Rice parameters and the group parameter deviation of each group; and decoding according to the group parameters of each group by using the Golomb-Rice coding algorithm to obtain the plurality of coefficient values in each group, wherein the coefficient blocks corresponding to the unit to be decoded include the plurality of coefficient values in each group.

In an implementation, the processing module is configured to decode according to a fixed-length coding algorithm to obtain an order k of each group, or obtaining the order k of each group according to a context model; and decode according to the order k of each group by using a k-order exponential Golomb coding algorithm to obtain a plurality of coefficient values in each group, wherein the coefficient blocks corresponding to the unit to be decoded include the plurality of coefficient values in each group.

In an implementation, the processing module is configured to obtain an order k of each group according to a context model; obtain a group parameter deviation of each group a fixed-length coding algorithm or truncated unary code; updating the order k of each group according to the group parameter deviation; and decode according to the updated order k of each group by using a k-order exponential Golomb coding algorithm to obtain a plurality of coefficient values in each group, wherein the coefficient blocks corresponding to the unit to be decoded include the plurality of coefficient values in each group.

In an implementation, the processing module is configured to determine a coding manner of a current group according to at least one of the coefficients, the prediction manner, the quantization method or the transform manner of one or more groups obtained by decoding; and decode according to a decoding manner corresponding to the coding manner of the current group to obtain the coefficients of the current group, wherein the coding manner of the current group is a combination of several coding manners such as Golomb-Rice coding, k-order exponential Golomb coding, or semi fixed-length coding.

In an implementation, among a plurality of groups of one or more coding units, two or more groups have different coding manners.

In an implementation, in response to a decoding manner of the unit to be decoded being any one of Golomb-Rice coding or k-order exponential Golomb coding, the processing module is configured to obtain the grouping manner of the unit to be decoded according to a prediction manner, a quantization method and/or a transform manner of the unit to be decoded.

In a sixth aspect, there is provided a video coding apparatus, including a transceiver module and a processing module, wherein the processing module is configured to scan one or more data blocks to be coded in an original image according to a first scanning manner to obtain a coefficient sequence; grouping the coefficient sequence according to a first grouping manner to obtain a plurality of groups of subsequences to be coded; and determining a coefficient coding manner corresponding to each of the plurality of groups of subsequences to be coded, and encoding the subsequences to be coded one by one to obtain a coded code stream; and the transceiver module is configured to transmit the coded code stream to a decoding end.

In an implementation, the grouping manner includes at least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, each of the data blocks to be coded is a data block composed of one of original pixel values of an image to be decoded, residual values obtained by predicting the original pixel values, coefficients obtained by quantizing the residual values, or transform coefficients obtained by transforming the residual values.

In a seventh aspect, there is provided a video image decoding apparatus, including a processor coupled with a memory; and the memory configured to store a computer program or instructions; wherein the processor is configured to execute the computer program or instructions in the memory to cause the apparatus to perform the method according to any one of the first aspect or the second aspect.

In an eighth aspect, there is provided a video image coding apparatus, including a processor coupled with a memory; and the memory configured to store a computer program or instructions; wherein the processor is configured to execute the computer program or instructions in the memory to cause the apparatus to perform the method according to any one of the third aspect or the fourth aspect.

In a ninth aspect, there is provided a coding and decoding system including the apparatus according to any one of the seventh aspect and the apparatus according to any one of the eighth aspect.

In tenth aspect, there is provided an electronic device for performing the method according to any one of the first aspect or the second aspect.

In a eleventh aspect, there is provided an electronic device for performing the method according to any one of the third aspect or the fourth aspect.

In a twelfth aspect, there is provided a readable storage medium, including a program or instructions, wherein when the program or instructions is executed by a processor, the method according to any one of the first aspect or the second aspect.

In an thirteenth aspect, there is provided a readable storage medium, including a program or instructions, wherein when the program or instructions is executed by a processor, the method according to any one of the third aspect or the fourth aspect.

In a fourteenth aspect, there is provided a circuit for performing the method according to any one of the first aspect or the second aspect.

In a fifteenth aspect, there is provided a circuit for performing the method according to any one of the third aspect or the fourth aspect.

In a sixteenth aspect, there is provided a computer application program, wherein the computer application program, when run on a computer or a processor, causes the computer or the processor to perform the method according to any one of the first aspect or the second aspect.

In a seventeenth aspect, there is provided a computer application program, wherein the computer application program, when run on a computer or a processor, causes the computer or the processor to perform the method according to any one of the third aspect or the fourth aspect.

It can be understood that any video coding and decoding apparatus, video coding and decoding system, computer-readable storage medium or computer program product provided above can be realized by the corresponding methods provided above. Therefore, the beneficial effects that can be achieved can refer to the beneficial effects in the corresponding methods provided above, which will not be repeated here.

BRIEF DESCRIPTION OF THE DRAWINGS

FIG. 4B is a flowchart of a video coding and decoding method according to an embodiment of the present disclosure.

FIG. 5 is a schematic diagram of a unit to be decoded in a video coding and decoding method according to an embodiment of the present disclosure.

FIG. 6 is a schematic diagram of grouping and scanning in a video coding and decoding method according to an embodiment of the present disclosure.

FIG. 7 is a schematic diagram of a data part in a unit to be decoded in a video coding and decoding method according to an embodiment of the present disclosure.

FIG. 8 is a schematic diagram of a grouping manner of a unit to be decoded in a video coding and decoding method according to an embodiment of the present disclosure.

FIG. 9 is a schematic diagram of a grouping manner of a unit to be decoded in a video coding and decoding method according to an embodiment of the present disclosure.

DETAILED DESCRIPTION OF THE EMBODIMENTS

Figure 1:
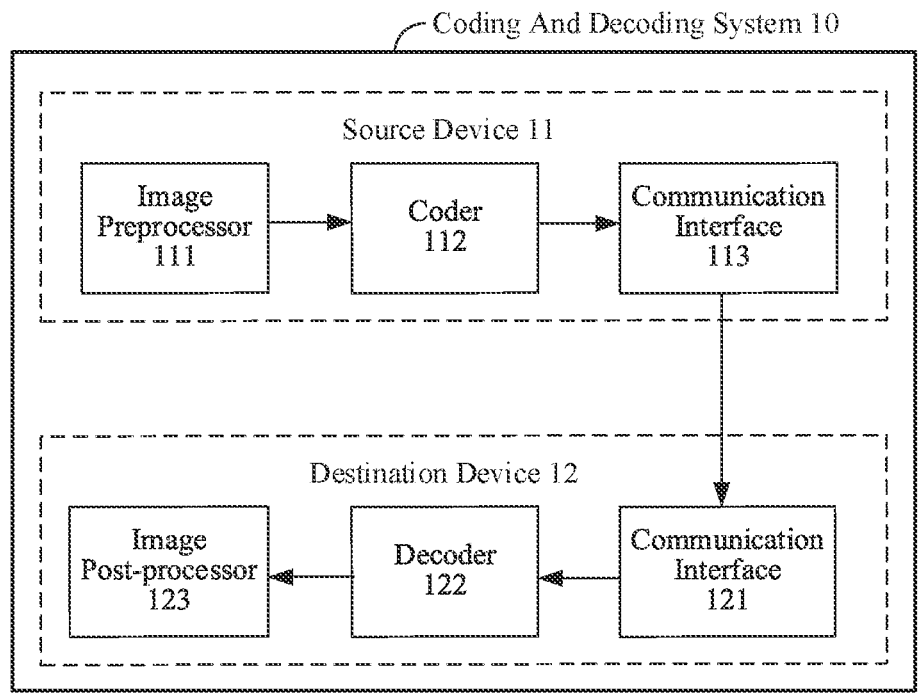
FIG. 1 is an architecture diagram of a coding and decoding system according to an embodiment of the present disclosure.

Hereinafter, terms "first" and "second" are only used to the purpose for the description, and cannot be understood as indicating or implying relative importance or implying indicating the number of indicated technical features. Therefore, features defined as "first" and "second" can explicitly or implicitly include one or more of these features. In the description of the embodiments of the present disclosure, unless otherwise specified, "a plurality" means two or more.

It to be noted that in the present disclosure, the term "exemplary" or "for example" is used to represent an example, an illustration, or a description. Any embodiment or design solution described as an "exemplary" or "for example" in the present disclosure should not be construed as being more preferred or having more advantages than other embodiment or design solution. Exactly, use of the term "exemplary" or "for example" or the like is intended to present a relative concept in a specific manner.

The technical solution in the embodiments of the present disclosure will be described clearly and completely in combination with accompanying drawings in the embodiments of the present disclosure. Obviously, the described embodiments are only a part of the embodiments of the present disclosure, not all of them. Based on the embodiments in the present disclosure, all other embodiments obtained by ordinary technical personnel in this field without creative labor fall within the protection scope of the present disclosure.

Firstly, technical terms involved in the embodiments of the present disclosure are introduced. Video sequence/image sequence: a complete image in a video is usually referred to as a "frame" (picture), and a video composed of many frames in chronological order is referred to as a video sequence, or can be referred to as an image sequence.

Video coding technology: a video sequence includes a series of redundancy information such as spatial redundancy, temporal redundancy, visual redundancy, information entropy redundancy, structure redundancy, knowledge redundancy, and importance redundancy. In order to remove redundancy information from the video sequence as much as possible and reduce an amount of data that is used to represent a video, a video coding technology is proposed, to reduce storage space and reduce occupied transmission bandwidth. The video coding technology is also referred to as a video compression technology.

The process of video coding usually includes prediction, transformation, quantization, entropy coding, and the like. Quantized transform coefficients can be coded through the entropy coding. The specific process will be described below and will not be repeated herein.

In the international common scope, video compression coding standards can include, for example, advanced video coding (AVC) in part 10 of MPEG-2 and MPEG-4 standards formulated by Motion Picture Experts Group (MPEG), and H.263, H.264, and H.265 (also referred to as high efficiency video coding standard (HEVC) formulated by International Telecommunication Lion-Telecommunication Standardization Sector (ITU-T).

It should be noted that in a coding algorithm based on a hybrid coding architecture, the above compression coding manners can be mixed.

Residual: in a video coding process, it is necessary to remove spatial and temporal redundancy through the prediction process. A coder obtains one or more predicted values through prediction, and subtracts the predicted values from one or more original pixel values to obtain one or more residual values. A residual block is a basic unit of transformation, quantization and entropy coding.

Transformation: in a video coding process, the transformation refers to transforming an image described in a form of pixels in a spatial domain into an image of a transform domain which is denoted in the form of transform coefficients. Since most images contain many flat regions and slowly-changing regions, decentralized distribution of image energy in the spatial domain is transformed into centralized distribution in a transform domain in a proper transformation process, thereby removing frequency domain correlation between signals and effectively compress bit stream in cooperation with quantization process. The transformation process can transform the pixel values in a time domain into a frequency domain. Since the large proportion of low-frequency components in the actual residual block, energy is concentrated in the low-frequency region through transform. That is, the transformed low-frequency coefficient has a relatively large value and the high-frequency coefficient has a relatively small value.

Transform coefficient: a coefficient of the residual block after transformation and quantization is referred to as a transform coefficient. The pixel values in the residual block are referred to as coefficients. After the residual is transformed, the low-frequency coefficients in an upper-left corner and the high-frequency coefficients in a lower-right corner. From the upper-left corner to the lower-right corner, the frequency is getting bigger and bigger.

Binarization: also referred to as binary switch, symbols or coefficients to be coded are binarized, and the binarized symbols or coefficients are converted into binary strings. Binary strings obtained by coding the same coefficients with different binarization methods may have different binary probability models and different string lengths.

Context: in general, different syntax elements are not completely independent, and the same syntax element itself also has certain memory. Therefore, according to the theory of conditional entropy, using other coded syntax elements for conditional coding can further improve coding performance compared with independent coding or memoryless coding. These coded symbol information used as conditions are referred to as context.

Context model: in video coding and decoding, the process of updating symbol probability based on context is referred to as a context model, and according to specific application conditions, multiple context models that can be used by the same syntax element to adaptively update the symbol probability under current conditions, thereby further compressing the code rate.

Entropy coding: refers to performing lossless coding according to the principle of information entropy, which is at the last processing module in a video compression to convert a series of element symbols representing a video sequence into one binary code stream for transmission or storage. The output data of the entropy coding module is the final code stream after compression of the original video. The entropy coding can effectively remove the statistical redundancy of these video element symbols and is one of important tools for ensuring compression efficiency of video coding.

Raster scanning: refers to mapping a two-dimensional rectangular raster to a one-dimensional raster. An entry to scan the one-dimensional raster is a first row of the two-dimensional raster, and then a second row, a third row, and the like are scanned. The rows in the raster are scanned from left to right.

Upper-right diagonal scanning: refers to scanning from the last coefficient in a lower-right corner of a coefficient block, and ending at the first coefficient in an upper-left corner of the coefficient block. The scanning order in each block is in the order of a lower-right upper-right lower-left upper-left, and other blocks are the same. The scanning order between blocks is the same as the scanning order between coefficients, and the scanning order is also in the order of a lower-right upper-right lower-left upper-left.

Horizontal reciprocating scanning: refers to mapping a two-dimensional rectangle to a one-dimensional string. An entry to scan the one-dimensional string is a starting row of two-dimensional rectangle, and then the whole two-dimensional rectangle is scanned row by row. The scanning direction of the starting row is from left to right, and the scanning direction of adjacent rows of the starting row is from right to left. Any two adjacent rows have opposite scanning directions.

Inverse horizontal scanning: refers to scanning from the last coefficient in the lower-right of the coefficient block, ending at the first coefficient in the upper-left of the coefficient block, and scanning from right to left and from bottom to top in each coefficient block. The scanning order between blocks is the order of a lower-right block upper-right block lower-left block upper-left block.

Inverse vertical scanning: refers to scanning from the last coefficient in the lower-right of the coefficient block, ending at the first coefficient in the upper-left of the coefficient block, and scanning from bottom to top and from right to left in each block.

Z-scan: refers to scanning an upper-left corner, then an upper-right corner, then a lower-left corner, and finally a lower-right corner for any square with even sides.

Unary code: is a simple binaryzation method. Specifically, for a non-negative integer N, its unary code is represented as N 1s plus one 0.

Truncated unary code: is a variant of unary code. Specifically, when the maximum value of a symbol to be coded is known as N_max, assuming that a current symbol to be coded is a non-negative integer N, if N<N_max, the truncated unary-code is the unary code; and if N=N_max, the truncated unary code is N 1s.

Truncated binary code: refers to calculating related variables (stage, num0, num1, thd, and the like) of val. For 0~(thd−1), a binary symbol string length thereof is a fixed-length code of stage, and for thd~val, its binary symbol string length thereof is a fixed-length code of (stage+1).

Run-length coding: refers to recording the number of consecutive occurrences of each value as a coding value. For example: 000111001101010001100, output after compression: 33221111422.

Fixed-length coding: refers to performing coding on coefficients to be coded by using a fixed code length, for example, ASCII codes coded with 8-bit binary numbers.

Semi fixed-length coding: refers to grouping the coefficients to be coded according to a prediction direction and a residual size, coding grouping modes, coding each group with a code length, and coding coefficients in the same group using the same fixed length.

K-order exponential Golomb coding: k-order exponential Golomb coding includes prefix and suffix, and the coding method includes the following steps: 1) writing a number X in binary form, removing the lowest k bits, and then adding 1 to obtain T; 2) calculating the number of bits of T, and adding T−1 zeros in front; 3) adding the removed lowest k bits back to the end of the bit string.

Truncated Rice coding: truncated Rice coding includes prefix and suffix. Given a maximum upper limit cMax and a Rice parameter cRice, a symbol cVal to be coded is coded.

Huffman coding: refers to counting the frequency of all the coefficients, building a Huffman tree, assigning relatively short codewords to coefficients with relatively high probability, and assigning relatively long code-words to coefficients with relatively low probability.

Golomb-Rice coding: Golomb-Rice is a variant of Golomb coding. Compared with Golomb coding, a restriction condition of a parameter m is that in must be a power of 2. Specifically, the parameter m is initialized, and m must be the power of 2; q and r are calculated, where q=N/m, and r=N&(m−1), q is coded by using unary code, and a low log 2(m bit of the binary bit of r is taken as a codeword of r.

Next, Golomb-Rice coding algorithm will be introduced in combination with a JPEG-LS coding model.

In JPEG-LS coding algorithm, a pixel gradient in a certain direction is calculated by using reconstructed pixel values around. A gradient value can be calculated according to a prediction direction of a current pixel; or gradient values in horizontal and vertical directions can be calculated according to experience, and then the gradient is quantized.

Threshold parameters T1, T2 and T3 of gradients are calculated according to JPEG-LS:

$$maxval = 2^n - 1$$

$$factor = (maxval + 128) \gg 8$$

$$\begin{cases} T1 = factor + 2 + 3Near \\ T2 = factor * 4 + 3 + 5Near, \\ T3 = facto * 17 + 4 + 7Near \end{cases}$$

where n is an image bit width, and Near is a quantization distortion parameter. The gradient is quantized according to the threshold parameters T1, T2 and T3 as follows:

$$Q_1 = \begin{cases} -4 & D_i \leq -T_3 \\ -3 & -T_3 < D_i \leq -T_2 \\ -2 & -T_2 < D_i \leq -T_1 \\ -1 & -T_1 < D_i < -Near \\ 0 & -Near \leq D_i \leq Near \\ 1 & Near < D_i < T_1 \\ 2 & T_1 \leq D_i < T_2 \\ 3 & T_2 \leq D_i < T_3 \\ 4 & T_3 \leq D_i \end{cases}$$

where Di represents a gradient calculation value, and i represents multiple directions. A corresponding context index is obtained according to the quantified gradient:

$$Q = (Q_1 * 9 + Q_2) * 9 + Q_3.$$

Adaptive error correction is performed according to a symbol sign of an index value Q and a residual correction value C[Q] (which is calculated by the cumulative residual of reconstructed pixels according to the context): (Some are like SAO, the predicted value is corrected):

if (sign == 1)  Px = Px + c[Q];

else  Px = Px − c[Q];

if(Px > Maxval)  Px = Maxval;

else if (Px < 0)  Px = 0;

In order to further reduce an amplitude of a residual value Errval, the near lossless compression quantization formula is:

$$Errval = (sign)? \frac{Errval - Near}{2*Near + 1} : \frac{Errval + Near}{2*Near + 1},$$

where sign represents the symbol sign of the index value Q, and a range of a prediction error at this time is ±(range−1).

Range0=(2n−1) represents an original pixel range;
Range0=±range represents a predicted residual range;

range1=−(range0−Near)/(2Near+1) represents a quantized minimum value;
range2=(range0+Near)/(2Near+1) represents a quantized maximum value; and
range=range2+1.

In order to compress the range of error values again, when the prediction error Errval is less than −range/2, the range value is added to the prediction error Errval. After this step, if the prediction error Errval is greater than or equal to (1+range)/2, it is necessary to subtract the range value from the prediction error Errval. After processing, absolute values of all prediction errors Errval will not be greater than (range+1)/2. The formula of modulus reduction is as follows:

$$Errval = \begin{cases} Errval + Range & Errval < -\frac{Range}{2} \\ Errval - Range & Errval \geq -\frac{Range}{2} \\ Errval & other \end{cases}.$$

Finally, the k value of Golomb coding is estimated according to the context.

A represents a context residual absolute value accumulator (that is, the sum of absolute values of the first n coded residual values).

B+=Errval*(2Near+1) represents a context reconstruction residual accumulator (that is, the sum of the first n coded reconstruction values), and is used to calculate a prediction error correction parameter C[Q]. N is a counter corresponding to the context, and is used to store the number of times the context appears. Whenever a value of B/N (an average value of the corrected residuals) increases by 0.5 or more, a value of C[Q] will increase by 1; whereas when the value of B/N decreases by 0.5 or more, the value of C[Q] will decrease by 1. At the same time, in order to make the calculation more in line with local characteristics, a threshold N0 can be set. When N is greater than N0, values of N and A are halved, and values of B and C[Q] are also halved.

The calculation of K is an expected value derived under the assumption that a current residual distribution conforms to a geometric distribution. Taking a positive integer m as a parameter, Golomb coding is performed on n, which is divided into two parts, namely, binary code of n % m and unary code of n/m. For coded variables with geometric distribution, there is always an m to make the average code length after coding the shortest. Golomb coding is referred to as Golomb-Rice coding when the value of m is 2^k, where K=min {k1/2k1N>=A}.

An original range of residuals is ±(range+1)/2, the residuals is mapped:

$$MErrval = \begin{cases} 2Errval, & Errval \geq 0 \\ -2Errval - 1, & Errval < 0 \end{cases},$$

Golomb-Rice coding is used for Merrval.

Meanwhile, for the flat regions, that is, Di=0, run-length coding is directly used. When it is detected that adjacent pixels a=b=c=d, that is, g1=g2=93=0, it means that the coding has reached a very flat region, and a run-length coding mode will be entered. In a run-length mode, continue to detect whether pixels after a current pixel x are equal to x (in near lossless mode, it is determined whether a difference between the pixels after x with x is within an allowable range). If the pixels after the current pixel x are equal to x, continue to detect later, and then record the number of the same value (including x), that is, a run length.

In the related art, a scan region-based coefficient coding (SRCC) technology is mainly used for coding coefficients with a residual value of 0 compared with lossy coding, and is not suitable for lossless coding or near lossless coding. A context-based adaptive binary arithmetic coding (CABAC) technology is relatively complicated, which will increase the complexity of coding and decoding, and thus it is not suitable for near lossless compression. The existing Golomb-Rice coding and semi fixed-length coding have better effects than those used for lossless coding and near lossless coding. However, the code length of Golomb coding depends on the selected order k, if the k value is not accurate, the binary code length will be very long, and thus it is generally only suitable for point by point coding to update the k value quickly. Semi fixed-length coding can effectively control the code length within a certain range, but before coding each coefficient, the code length of these coefficients needs to be coded first, and thus this method is generally suitable for block coding. If the number of coefficients in a group is too small, this method will increase the average code length, but increasing the number of coding coefficients will often lead to an increase in the range of coefficient values. Since each coefficient in the group uses the same code length, the larger the maximum value in the group, the greater the average code length. In view of the shortcomings of these two solutions, a coefficient coding solution based on lossless coding and near lossless coding is proposed by combining these two coding methods.

Next, the implementation environment and application scenarios of the embodiment of the present disclosure are briefly introduced. The video coding and decoding method provided by the present disclosure can be applied to the video coding and decoding system shown in FIG. 1.

Hereinafter, a system architecture to which an embodiment of the present disclosure is applied will be described. Referring to FIG. 1, there is provided an architecture diagram of a coding and decoding system (also referred to as an encoding and decoding system) 10 applied in an embodiment of the present disclosure. As shown in FIG. 1, the coding and decoding system 10 can include a source device 11 and a destination device 12. The source device 11 is used to code an image, and thus the source device 11 may be referred to as a video coding device. The destination device 12 is used to decode the coded image data generated by the source device 11, and thus the destination device 12 may be referred to as a video decoding device.

The source device 11 and the destination device 12 can include various apparatuses, including, for example, desktop computers, mobile computing devices, notebook computers (for example, laptop computers), tablet computers, set-top boxes, mobile phones, televisions, cameras, display apparatuses, digital media players, video game consoles, vehicle-mounted computers, wireless communication devices, and the like.

Optionally, the source device 11 and destination device 12 in FIG. 1 can be two separate devices, or the source device 11 and destination device 12 can be the same device, that is, the source device 11 or corresponding functions thereof and the destination device 12 or corresponding functions thereof can be integrated on the same device.

Communication can be performed between the source device 11 and the destination device 12. For example, the destination device 12 can receive coded image data from the source device 11. In an example, one or more communication media may be included between the source device 11 and the destination device 12, and the coded image data can be transmitted through the one or more communication media. The one or more communication media may include routers, switches, base stations, or other devices that facilitate communication from the source device 11 to the destination device 12.

As shown in FIG. 1, the source device 11 includes a coder 112. Optionally, the source device 11 may further include an image preprocessor 111 and a communication interface 113. The image preprocessor 111 is used to perform preprocessing on the received image to be encoded. For example, the preprocessing performed by the image preprocessor 111 may include retouching, color format conversion (for example, from RGB format to YUV format), retouching or denoising, and the like. The coder 112 is used to receive the preprocessed image and process the preprocessed image by using a relevant prediction mode (for example, the prediction mode in various embodiments herein) to provide the coded image data. In some embodiments, the coder 112 may be used to perform image coding processes in various embodiments described below. The communication interlace 113 can be used to transmit the coded image data to the destination device 12 or any other device (for example, a memory) for storage or direct reconstruction, and other devices can be any device used for decoding or storage. The communication interface 113 can also encapsulate the coded image data into a suitable format before transmitting.

Optionally, the image preprocessor 111, the coder 112 and the communication interface 113 described above may be hardware components in the source device 11, or software programs in the source device 11, which is not limited in the embodiment of the present disclosure.

As shown in FIG. 1, the destination device 12 includes a decoder 122. Optionally, the destination device 12 may further include a communication interface 121 and an image post-processor 123. The communication interface 121 can be used to receive the coded image data from the source device 11 or any other source device such as a storage device. The communication interface 121 can also decapsulate the data transmitted by the communication interface 113 to obtain the coded image data. The decoder 122 is used to receive the coded image data and output decoded image data (also referred to as reconstructed image data or image data having be reconstructed). In some embodiments, the decoder 122 may be used to perform the coefficient decoding process described in the following embodiments.

The image post-processor 123 is used to perform post-processing on the decoded image data to obtain post-processed image data. The post-processing performed by the image post-processor 123 may include color format conversion (for example, from YUV format to RGB format), color adjustment, retouching or resampling, or any other processing, and may also be used to transmit the post-processed image data to a display device for display.

Similarly, optionally, the communication interface 121, the decoder 122 and the image post-processor 123 described above may be hardware components or software programs in the destination device 12, which is not limited in the embodiment of the present disclosure.

Hereinafter, the structures of the coder and decoder in FIG. 1 are briefly introduced.

Figure 2:
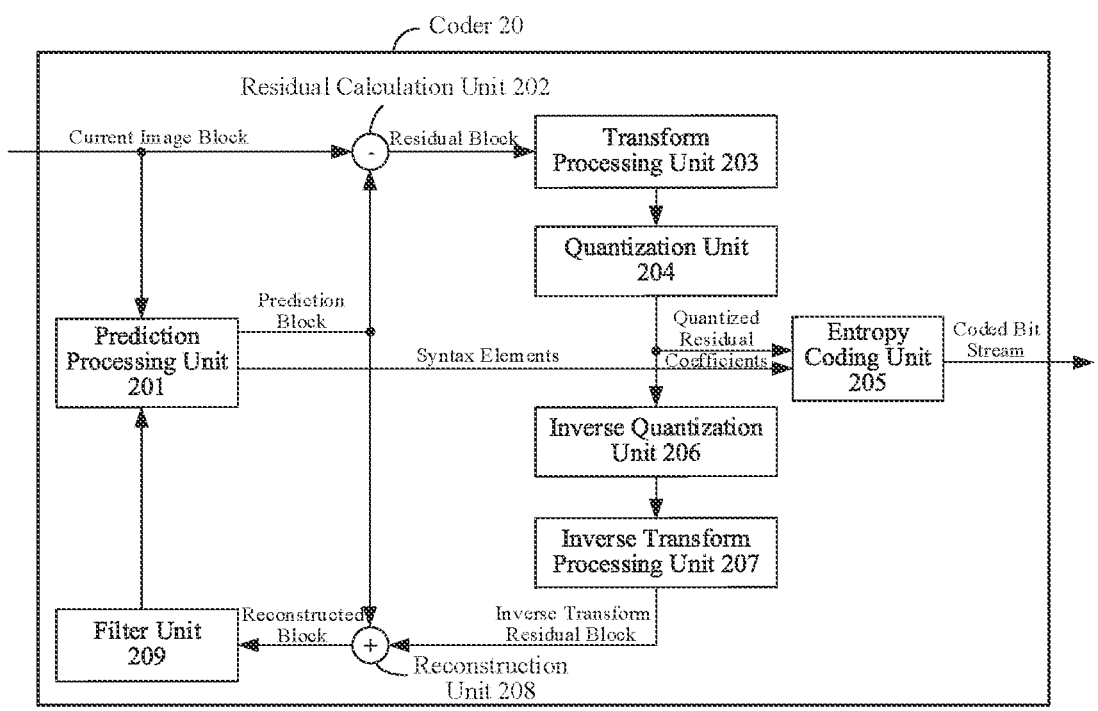
FIG. 2 is an internal architecture diagram of a coder according to an embodiment of the present disclosure.

Referring to FIG. 2, FIG. 2 illustrates a schematic block diagram of an example of a coder 20 for implementing an embodiment of the present disclosure. In FIG. 2, the coder includes a prediction processing unit 201, a residual calculation unit 202, a transform processing unit 203, a quantization unit 204, an entropy coding unit 205, an inverse quantization unit (also referred to as a reverse quantization unit) 206, an inverse transform processing unit (also referred to as a reverse transform processing unit) 207, a reconstruction unit (or referred to as a reconfiguration unit) 208 and a filter unit 209. Optionally, the coder 20 may further include a buffer and a decoded image buffer. The buffer is used to buffer reconstructed image blocks output by the reconstruction unit 208, and the decoded image buffer is used to buffer filtered image blocks output by the filter unit 209.

An input of the coder 20 is an image block of an image (which may be referred to as the image to be coded), and the image block may also be referred to as a current image block or the image block to be coded. The coder 20 may further include a dividing unit (not shown in FIG. 2) for dividing the image to be coded into a plurality of image blocks. The coder 20 is used to code the image to be coded block by block, for example, the coding process is performed on each of the image blocks.

The prediction processing unit 201 is configured to receive or obtain an image block (a current image block to be coded of the current image to be coded, which may be referred to as a current image block, and the current image block can be understood as a true value of the image block) and the reconstructed image data, and predict the current image block based on relevant data in the reconstructed image data to obtain a prediction block of the current image block. Optionally, the prediction processing unit 201 may include an inter-prediction unit, an intra-prediction unit and a mode selection unit. The mode selection unit is configured to select an intra-prediction mode or an inter-prediction mode. If the intra-prediction mode is selected, the intra-prediction unit performs the prediction process; and if the inter-prediction mode is selected, the inter-prediction unit performs the prediction process.

The residual calculation unit 202 is configured to calculate a residual between the true value of the image block and the prediction block of the image block to obtain a residual block. For example, by subtracting a pixel value of the prediction block from a pixel value of the image block pixel by pixel.

The transform processing unit 203 is configured to perform transform such as discrete cosine transform (DCT) or discrete sine transform (DST) on the residual block to obtain transform coefficients in a transform domain. The transform coefficients can also be referred to as transform residual coefficients, which can represent residual blocks in the transform domain.

The quantization unit 204 is configured to quantize the transform coefficients by applying scalar quantization or vector quantization to obtain quantized transform coefficients. The quantized transform coefficients may be referred to as quantized residual coefficients. The quantization process can reduce a bit depth associated with some or all of the transform coefficients. For example, n-bit transform coefficients may be rounded down to m-bit transform coefficients during quantization, where n is greater than m. By adjusting quantization parameters (QP), the quantization degree can be modified. For example, for scalar quantization, different scales can be applied to realize relatively fine or coarse quantization. A relatively small quantization step corresponds to a relatively fine quantization, while a relatively large quantization step corresponds to a relatively coarse quantization. Appropriate quantization step size can be indicated based on the quantization parameters.

The entropy coding unit 205 is configured to perform entropy coding on the above quantized residual coefficients to output the coded image data (that is, the coding result of the current image block to be coded) in the form of coded bit stream, and then transmit the coded bit stream to the decoder or store the coded bit stream for subsequent transmission to the decoder or retrieval. The entropy coding unit 205 can also be configured to perform entropy coding on other syntax elements of the current image block, for example, the prediction mode is entropy coded into a code stream, and the like. Entropy coding algorithms include, but are not limited to, variable length coding (VLC) algorithm, context adaptive VLC (CAVLC) algorithm, arithmetic coding algorithm, context adaptive binary arithmetic coding (CABAC) algorithm, syntax-based context-adaptive binary arithmetic coding (SBAC) algorithm and probability interval partitioning entropy (PIPE) algorithm.

The inverse quantization unit 206 is configured to perform the inverse quantization on the quantized coefficients to obtain inverse quantized coefficients. The inverse quantization is a reverse application of the quantization unit 204, for example, apply, based on or using a same quantization step size as the quantization unit 204, the inverse of a quantization solution applied by the quantization unit 204. The dequantized coefficients may also be referred to as dequantized residual coefficients or quantized transform coefficients.

The inverse transform processing unit 207 is configured to perform inverse transform on the aforementioned inverse quantization coefficients. It should be understood that the inverse transform is a reverse application of the above transform processing unit 203. For example, the inverse transform may include the inverse discrete cosine transform (DCT) or the inverse discrete sine transform (DST) to obtain an inverse transform block in a pixel domain (or sample domain). The inverse transform block may also be referred to as an inverse transform dequantized block or an inverse transform residual block.

The reconstruction unit 208 is configured to add the inverse transform block (that is, an inverse transform residual block) to the prediction block to obtain a reconstructed block in the sample domain. The reconstruction unit 208 can be a summator, for example, adding sample values (that is, pixel values) of the residual block and the sample values of the prediction block. The reconstructed block output by the reconstruction unit 205 can be subsequently configured to predict other image blocks, for example, in the intra-prediction mode.

The filter unit 209 (or simply "filter") is configured to filter the reconstructed block to obtain a filtered block, so as to smoothly perform pixel conversion or improve image quality. The filter unit can be a loop filter unit intended to represent one or more loop filters, for example, deblocking filters, sample-adaptive offset (SAO) filters, or other filters, for example, bilateral filters, adaptive loop filters (ALFs), sharpening or smoothing filters, or collaborative filters. Optionally, the filtered block output by the filter unit 209 can be subsequently configured to predict other image blocks, for example, in the inter-prediction mode.

Specifically, in the embodiment of the present disclosure, the coder 20 is used to implement the video coding and decoding method described in the following embodiments.

Figure 3:
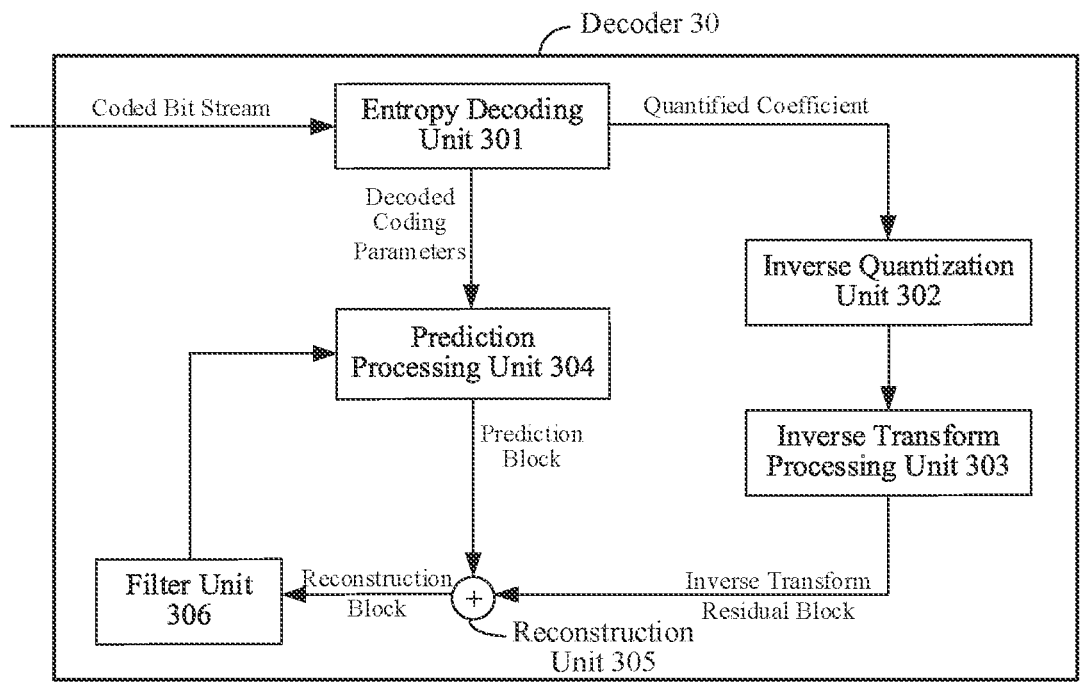
FIG. 3 is an internal architecture diagram of a decoder according to an embodiment of the present disclosure.

Referring to FIG. 3, FIG. 3 illustrates a schematic block diagram of an example of a decoder 30 for implementing an embodiment of the present disclosure. The decoder 30 is used to receive, for example, coded image data (that is, a coded bit stream, for example, a coded bit stream including image blocks and associated syntax elements) coded by the coder 20 to obtain a decoded image. The decoder 30 includes an entropy decoding unit 301, an inverse quantization unit 302, an inverse transform processing unit 303, a prediction processing unit 304, a reconstruction unit 305 and a filter unit 306. In some examples, the decoder 30 may perform a decoding pass that is substantially reciprocal to the coding pass described by the coder 20 in FIG. 2. Optionally, the decoder 30 may further include a buffer and a decoded image buffer. The buffer is used to buffer reconstructed image blocks output by the reconstruction unit 305, and the decoded image buffer is used to buffer filtered image blocks output by the filter unit 306.

The entropy decoding unit 301 is configured to perform entropy decoding on coded image data to obtain quantized coefficients and/or decoded coding parameters (for example, decoding parameters can include any or all of inter-prediction parameters, intra-prediction parameters, filter parameters and/or other syntax elements). The entropy decoding unit 301 is further configured to forward the decoded coding parameters to the prediction processing unit 304, so that the prediction processing unit enables to perform a prediction process according to the coding parameters.

The function of the inverse quantization unit 302 may be the same as that of the inverse quantization unit 206 of the coder 20, for performing inverse quantization (that is, dequantization) of the quantized coefficients decoded by the entropy decoding unit 301.

The function of the inverse transform processing unit 303 can be the same as that of the inverse transform processing unit 207 of the coder 20, and the function of the reconstruction unit 305 (for example, the summator) can be the same as that of the reconstruction unit 208 of the coder 20, for performing inverse transform (for example, inverse DCT, inverse integer transform or conceptually similar inverse transform process) on the quantized coefficients to obtain an inverse transform block (also referred to as an inverse transform residual block). The inverse transform block is the residual block of the current image block in the pixel domain.

The prediction processing unit 304 is configured to receive or obtain coded image data (for example, the coded bit stream of the current image block) and reconstructed image data. The prediction processing unit 304 may also receive or obtain prediction related parameters and/or information about the selected prediction mode (that is, decoded coding parameters) from the entropy decoding unit 301, and predict the current image block based on relevant data in the reconstructed image data and the decoded coding parameters to obtain a prediction block of the current image block. Optionally, the prediction processing unit 304 may include an inter-prediction unit, an intra-prediction unit and a mode selection unit. The mode selection unit is configured to select an intra-prediction mode or an inter-prediction mode. If the intra-prediction mode is selected, the intra-prediction unit performs the prediction process; and if the inter-prediction mode is selected, the inter-prediction unit performs the prediction process.

The reconstruction unit 305 is configured to add the inverse transform block (that is, an inverse transform residual block) to the prediction block to obtain a reconstructed block in the sample domain, for example, by adding sample values of the inverse transform residual block and the sample values of the prediction block.

The filter unit 306 is configured to filter the reconstructed block to obtain a filtered block. The filtered block is a decoded image block.

Specifically, in the embodiment of the present disclosure, the decoder 30 is configured to implement the video decoding method described in the following embodiments.

It should be understood that in the coder 20 and the decoder 30 of the embodiment of the present disclosure, the processing result for a certain stage may also be further processed and output to the next stage. For example, after interpolation-filtering, motion vector derivation or filtering, the processing result of the corresponding stage can be further clipped or shifted.

The video decoding method and the video coding method provided by the embodiments of the present disclosure can be executed by an electronic device, which can have the function of performing compression coding or decoding on any image or video image. In some embodiments, the electronic device can be a notebook computer, a tablet computer, a desktop computer, a portable computer, and the like, and the embodiment of the present disclosure does not limit this.

Figure 4A:
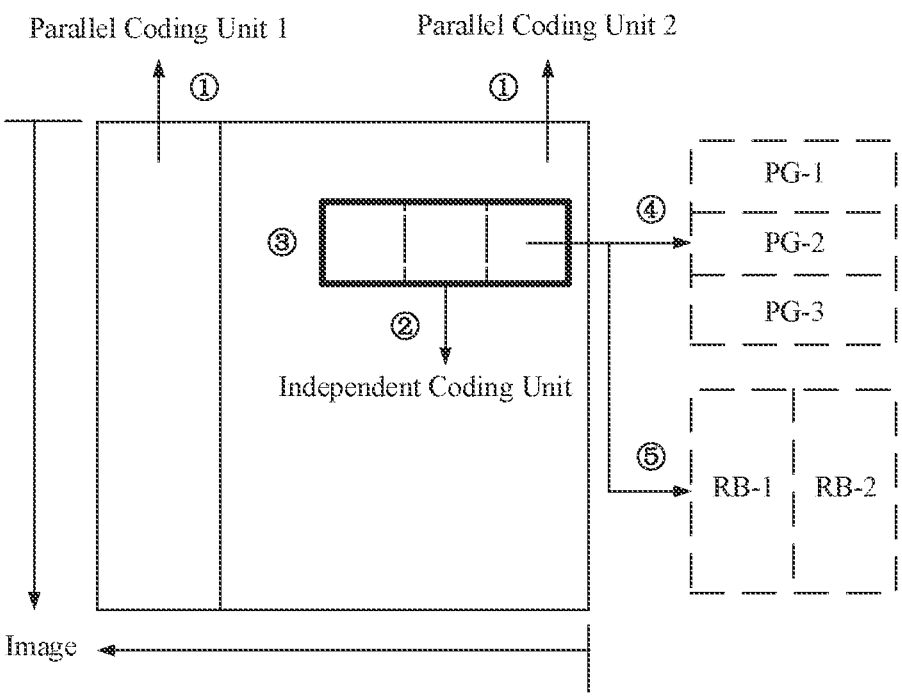
FIG. 4A is a flowchart of a video coding and decoding method according to an embodiment of the present disclosure.

Based on the video coding and decoding system shown in FIG. 1 to FIG. 3, the embodiment of the present disclosure provides a possible video coding/decoding method. As shown in FIG. 4A, FIG. 4A is a flowchart of a video coding/decoding according to an embodiment of the present disclosure. The video coding/decoding method includes process ① to process ⑤. Process ① to process ⑤ can be executed by any one or more of the coder 20, the decoder 30, the source device 11 or the destination device 12 described above.

Process ①: a frame of image is divided into one or more parallel coding units that do not overlap with each other. There is no dependency relationship between the one or more parallel coding units, and thus the one or more parallel coding units can be coded and decoded fully in parallel/independent, for example, a parallel coding unit 1 and a parallel coding unit 2 shown in FIG. 4A.

Process ②: for each of the parallel coding units, the parallel coding unit can be further divided into one or more independent coding units that do not overlap with each other. The independent coding units can be independent of each other, but they can share some parallel coding unit header information.

For example, a width of each of the independent coding units is w_lcu, and a height of the independent coding unit is h_lcu. If the parallel coding unit is divided into one independent coding unit, a size of the independent coding unit is exactly the same as a size of the parallel coding unit; otherwise, the width of the independent coding unit should be greater than the height (unless it is an edge region).

In general, the independent coding unit can be a fixed w_lcu×h_lcu, where w_lcu and h_lcu are both the N-th power of 2 (N≥0), for example, the size of the independent coding unit is 128×4, 64×4, 32×4, 16×4, 8×4, 32×2, 16×2, or 8×2, or the like.

As a possible example, the independent coding unit can be a fixed 128×4. If the size of the parallel coding unit is 256×8, the parallel coding unit can be divided into four independent coding units; and if the size of the parallel coding unit is 288×10, the parallel coding unit can be divided into: the first/second row consists of two independent coding units of 128×4 and one independent coding unit of 32×4; and the third row consists of two 128×2 and one independent coding unit of 32×2.

It is worth noting that the independent coding unit can include three components, namely, luminance Y, chrominance Cb and chrominance Cr, or three components, namely, red (R), green (G) and blue (B), or only one of them. If the independent coding unit contains three components, the size of these three components can be exactly the same or different, which is related to the input format of the image.

Process ③: for each of the independent coding units, the independent coding unit can be further divided into one or more coding units that do not overlap with each other. Each of the coding units in the independent coding unit can depend on each other, for example, a plurality of coding units can perform mutual reference precoding.

If a size of the coding unit is the same as the size of the independent coding unit (that is, the independent coding unit is only divided into one coding unit), the size of the coding unit can be all the sizes described in process ②.

If the independent coding unit is divided into a plurality of coding units that do not overlap with each other, feasible division examples include: horizontal division (the height of the coding unit is the same as that of the independent coding unit, but the width of the coding unit is different from that of the independent coding unit, which can be ½, ¼, ⅛, 1/16, and the like), vertical division (the height of the coding unit is the same as that of the independent coding unit, but the height of the coding unit is different from that of the independent coding unit, which can be ½, ¼, ⅛, 1/16, and the like), and horizontal and vertical division (quadtree division), and the like, preferably, the horizontal division.

If a width of the coding unit is w_cu, and a height of the coding unit is h_cu, then the width of the coding unit should be greater than the height (unless it is an edge region). In general, the coding unit can be a fixed w_cu×h_cu, where w_cu and h_cu are both the N-th power of 2 (N is greater than or equal to 0), for example, 16×4, 8×4, 16×2, 8×2, 8×1, 4×1, and the like.

As a possible example, the coding unit may be a fixed 16×4. If the size of the independent coding unit is 64×4, the independent coding unit can be equally divided into four coding units; and if the size of the independent coding unit is 72×4, the coding units can be divided into four 16×4 and one 8×4.

It is worth noting that the coding unit can include three components, namely, luminance Y, chrominance Cb and chrominance Cr (or three components, namely, red R, green G, and blue B), or only one of them. If the coding unit contains three components, the dimensions of several components can be exactly the same or different, which is related to the input format of the image.

It is worth noting that process ③ is an optional step in the video coding and decoding method, and a video coder/decoder can code/decode the residual coefficients (or transform coefficients) of the independent coding units obtained in process ②.

Process ④: for the coding unit, the coding unit can be further divided into one or more prediction groups (PGs) that do not overlap with each other, PGs can also be referred to as Group. Each of the PGs codes and decodes according to a selected prediction mode to obtain a predicted value of the PG, which constitutes a predicted value of the whole coding unit. The residual value of the coding unit can be obtained based on the predicted value and an original value of the coding unit.

Process ⑤: the coding unit can be grouped based on the residual value of the coding unit to obtain one or more residual blocks (RBs) that do not overlap with each other. Residual coefficients or transform coefficients of each of RBs are coded and decoded according to a selected mode to form a residual coefficient stream or a transform coefficient stream. Specifically, it can be divided into two categories: transforming the residual coefficients and not transforming the residual coefficients.

The selected mode of the residual coefficients coding and decoding method in the above process ⑤ can include, but is not limited to, any of the following: a semi fixed-length coding method, an exponential Golomb coding method, a Golomb-Rice coding method, a truncated unary code coding method, a run-length coding manner, direct coding of the original residual value, and the like.

For example, the video coder can directly code the coefficients within the RB.

For another example, the video coder can also transform the residual block, for example, DCT, DST, Hadamard transform, and the like, and then code the transformed coefficients.

As a possible example, when the RB is relatively small, the video coder can directly quantize all the coefficients within the RB, and then perform binary coding. If the RB is relatively large, the RB can be further divided into a plurality of coefficient groups (CGs), and then each of the CGs is quantized uniformly, and binary coding is performed. In some embodiments of the present disclosure, the coefficient group (CG) and the quantization group (QG) may be the same.

Hereinafter, taking a semi fixed-length coding method as an example, the part of the residual coefficient coding will be exemplary illustrated. Firstly, a maximum absolute value of residual in an RB block is defined as a modified maximum (mm). Secondly, the number of coded bits for the residual coefficients in the RB block is determined (the number of the coded bits for the residual coefficients in the same RB block is consistent). For example, if a critical limit (CL) of the current RB block is 2, and the current residual coefficient is 1, it is necessary for the coding residual coefficient 1 to require 2 bits, which can be represented as 01. If the CL of the current RB block is 7, it means that residual coefficients of 8 bits and a sign bit of 1 bit are coded. The determination of the CL is to find a minimum M value that satisfies that all residuals in the current sib-block are within a range of $[-2^{(M-1)}, 2^{(M-1)}]$. If there are two boundary values $-2^{(M-1)}$ and $2^{(M-1)}$ at the same time, M should be increased by 1, that is, M+1 bits are needed to code all residuals of the current RB block; if there is only one of the boundary values $-2^{(M-1)}$ and $2^{(M-1)}$, a Trailing bit needs to be coded to determine whether the boundary value is $-2^{(M-1)}$ or $2^{(M-1)}$; and if all residuals do not exist in either $-2^{(M-1)}$ or $2^{(M-1)}$, then the Trailing bit does not need to be coded.

In addition, for some special cases, the video coder can also directly code the original value of the image instead of the residual value.

Based on the above problems, the present disclosure provides a video coding and decoding method for lossless and near lossless compression coding frameworks, which can code original pixel (quantized/non-quantized) values, predicted (quantized/non-quantized) residual coefficients, or transformed (quantized/non-quantized) transform coefficients as follows: (1) considering the difference of data distribution among original pixels, residual coefficients and transform coefficients, different coding methods are used for different data according to their distribution characteristics.

(2) At the same time, different scanning manners can be designed for the data, and the scanning manner should consider the distribution of the data, so that coefficients with similar amplitudes can be distributed together as much as possible.

(3) For the scanned data, it can be grouped irregularly according to the distribution of the data, or directly into fixed groups. The specific grouping situation of the data can be consistent with the coding and decoding conventions, or derived according to the context (including derived according to the coded data, derived according to the prediction coefficients, derived according to the coded parameters), or obtained by the way of transmitting parameters at the coding end.

(4) For different data distributions, coding can be performed directly according to the data to be coded, or parameter estimation can be performed according to the context to estimate the coding range of the coefficient to be coded, or the related coefficient value to be coded can be directly estimated, and then a parameter correction value can be calculated according to the estimated range, and it is possible to determine whether to pass another parameter correction value, so that the estimated parameters are more accurate.

(5) For different data distributions, parameter estimation can be performed according to the context to estimate the numerical range of the next group of coding coefficients (the number of each group of coefficients can be greater than or equal to 1), so as to select the coding method for the next group of coefficients according to the estimated values.

(6) For different data distributions, parameter estimation can be performed according to the context, and then a parameter correction value can be parsed from the code stream to obtain the numerical range of the next group of coding parameters; and the coding method for the next group of coefficients can be selected according to the numerical range. Different coding solutions and coding manners can be selected according to different ranges of coefficients.

(7) Since the data distribution in the time domain is different from the data distribution in the frequency domain, the data distribution in the time domain is relatively uniform, while the relatively large energy of the data in the frequency domain will be distributed on the low-frequency information, and thus the coding of the transform coefficients can be based on special grouping of the positions of the transformed coefficients.

(8) When performing coding on the coefficients, unary code, truncated unary code, truncated binary code, fixed-length coding, semi fixed-length coding, run-length coding, k-order exponential Golomb coding, truncated Rice coding, Golomb-Rice coding, Hoffman coding, arithmetic coding, adaptive variable length coding, or the like can be selected. Coding can be performed on the coefficients by using one or a combination of multiple coding manners.

In a specific implementation, the scanning manners of coding coefficients can include raster scanning, block scanning, horizontal scanning, vertical scanning, reciprocating (horizontal/vertical) scanning, diagonal (upper-left, upper-right, lower-left, lower-right) scanning, inverse diagonal scanning, inverse horizontal scanning, inverse vertical scanning or scanning based on a fixed scanning template.

On the whole, the overall coding process according to an embodiment of the present disclosure is consistent with the decoding process. Parameters that need to be written into the code stream can be obtained by rate distortion optimization (RDO) at the coding end or estimated. The video coding and decoding process according to the embodiment of the present disclosure mainly includes a process of block coding and a process without block coding.

1. Process of block coding: firstly, the coefficients are changed into one-dimensional vectors. If a region to be coded is a three-dimensional image, the three-dimensional image is first divided into one or more two-dimensional coefficient blocks; and if the region to be coded is one or more two-dimensional coefficient blocks, the two-dimensional coefficient blocks are scanned into one-dimensional coefficient vectors by using a certain scanning order.

Secondly, the coefficient vectors are grouped according to the coefficient size, and coefficients with similar amplitudes are divided into the same group. The one-dimensional coefficients are grouped according to several fixed grouping manners, and then the specific grouping information is coded; or the one-dimensional coefficient grouping manner is derived according to the prediction manner and the transform manner, a parameter group_param can be used for coding coefficients in the same group, and the parameter can guide the coding of all the following coefficients. The parameter group_param can be coded with a fixed-length code, or can also be coded with unary code or truncated unary code; and then each coefficient in the group is coded according to the group_param by using a certain coding manner.

2. Process without block coding: similar to the grouping solutions, the grouping manner is removed and the coefficients are coded one by one. For each coefficient to be coded, a value range of the coefficient to be coded can be derived based on the context, and a coding method can be selected based on the range for coding.

Hereinafter, the overall decoding process of the embodiment of the present disclosure will be briefly introduced: a) a scanning manner of the coefficients is determined; b) a type of the coefficients (original values, transform coefficients, predicted residual coefficients) is determined; c) a coding manner of the coefficients is determined; d) each of the coefficients or the required parameters for each group of coefficients is decoded from the code stream according to the coding manner; e) it is determined whether it is necessary to derive prediction parameters according to the context information by using the coding manner of the coefficients; f) if there are the prediction parameters, corresponding decoding is performed according to the prediction parameters and the parameters parsed in the code stream by using the coding manner of the coefficients; otherwise, prediction parameters is derived according to the context information; g) if there are groups, the decoded coefficients in each group are placed back to the original coefficient positions in sequence according to the code stream; otherwise, all coefficient values are directly decoded.

The manners determined in steps a), b) and c) at the decoding end can be determined by parsing the code stream, or can be determined according to the agreement of a coding and decoding end, or can also be determined by deriving from the decoding end (determined according to parameters such as the size of the current block or the prediction manner and the transform manner).

1. A process of block decoding mainly includes: firstly, a scanning manner of the block is determined; secondly, a grouping manner of the scanned coefficients is determined; and then, the parameter group_param in each group is decoded by using a certain decoding manner; each coefficient in the group is decoded according to the group_param by using a certain coding manner; finally, the coefficients in the coded block are restored to the original arrangement according to the scanning manner.

2. A process without block decoding mainly includes: firstly, a scanning manner of the block is determined; a value range of the coefficient of the current coding is predicted according to the context, and a decoding manner is selected for decoding according to the value range of the coefficient.

Next, the video decoding method and the video coding method provided by the embodiments of the present disclosure will be introduced in detail in combination with the accompanying drawings.

The present disclosure provides a video decoding method. Referring to FIG. 4B, FIG. 4B is a flowchart of a video coding and decoding method according to an embodiment of the present disclosure. The coding process in the method can be performed by the aforementioned coder, and the decoding process can be performed by the aforementioned decoder. The method can include the following steps.

401, one or more data blocks to be coded in an original image are scanned by a coding end according to a first scanning manner to obtain a coefficient sequence.

In an implementation, the coding end scans one or more original data blocks and can obtain coefficients to be coded based on different scanning manners. Specifically, the first scanning manner can include any of the following: raster scanning, block scanning, horizontal scanning, vertical scanning, reciprocating (horizontal/vertical) scanning, diagonal (upper-left, upper-right, lower-left, lower-right) scanning, inverse horizontal scanning, inverse vertical scanning, Hilbert scanning, or other scanning based on a fixed scanning template. The specific scanning process of each scanning manner can refer to relevant technical specifications, and the present disclosure does not impose too many restrictions on this.

The coding end can derive one or more scanning manners according to the prediction manner or the transform manner of the current coefficient. Alternatively, the coding end can select a scanning manner for all coefficients according to the pre-agreement of the coding end and the decoding end, so that the decoding end can also determine the scanning manner according to the pre-agreement.

In an implementation, the video coding and decoding method in the embodiment of the present disclosure can be suitable for coding original pixels, or coding residual values obtained by predicting the original pixel values, or coding coefficients obtained by quantizing the residual values obtained by predicting the original pixel values, or coding transformed coefficients obtained by transforming the predicted residual values, or coding coefficients obtained by quantizing the transformed coefficients obtained by transforming the predicted residual values, or the like. The coding of the above data can be coded and compressed by the embodiment provided by the present disclosure.

That is, the original data block, the unit to be coded, or the reconstructed data block obtained by decoding referred to in the embodiment of the present disclosure can be a data block composed of original pixel values of an image to be coded, or a data block composed of residual values obtained by predicting the original pixel values, or a data block composed of coefficients obtained by quantizing the residual values, or a data block composed of transform coefficients obtained by transforming the residual values, or a data block composed of coefficients obtained by quantizing the transform coefficients obtained by transforming the residual values. This will not be repeated in the following embodiments.

In an implementation, a data sequence to be coded in the embodiment of the present disclosure can be coefficient blocks of various sizes, for example, m×n data blocks, where m and n are both less than or equal to 64. For example, the unit to be coded can be 16×4 coefficient blocks, 16×1 coefficient blocks, 8×4 coefficient blocks, 8×2 coefficient blocks, 4×2 coefficient blocks, or the like.

402, the coefficient sequence is grouped by the coding end according to a first grouping manner to obtain a plurality of groups of subsequences to be coded.

In an implementation, the grouping manner includes at least one of a fixed-length grouping manner or a semi fixed-length grouping based on a coefficient value size, or a grouping division based on coefficient arrangement positions. The number of coefficients in the plurality of groups of subsequences to be coded can be the same or different. The specific grouping manners will be introduced later based on specific embodiments, and will not be repeated here.

403, a coefficient coding manner corresponding to each of the plurality of groups of subsequences to be coded is determined by the coding end, and the subsequences to be coded are coded one by one to obtain a coded code stream.

In an implementation, the coding manner can include at least one of unary code, truncated unary code, truncated binary code, fixed-length coding, semi fixed-length coding, k-order exponential Golomb coding, truncated Rice coding, Hoffman coding, or Golomb-Rice coding. The coding manner can also be a combination of a plurality of the above coding manners, which will be introduced later based on specific embodiments, and will not be repeated here.

In an implementation, the coding manner determined for the subsequences to be coded can be the same or different. The specific coding manners will be introduced later based on specific embodiments, and will not be repeated here.

404, the code stream is transmitted by the coding end one by one to the decoding end.

405, the code stream is obtained by the decoding end, and a scanning manner and a grouping manner of the unit to be decoded, and a coding manner corresponding to each group are determined.

The decoding end obtains the coded code stream and can decode the coded code stream segment by segment. The unit to be decoded can be a data unit that is decoded by the decoding end in the coded code stream.

In an implementation, the decoding end can determine at least one of the scanning manner and the grouping manner of the unit to be decoded and the coding manner corresponding to each group according to the pre-agreement of the coding and decoding end or context information. Alternatively, the decoding end can also obtain at least one of the scanning manner and the grouping manner of the unit to be decoded and the coding manner corresponding to each group by parsing the code stream. Alternatively, the decoding end can also obtain the grouping manner according to a prediction manner, a quantization manner and/or a transform manner of the unit to be decoded. The following will be introduced based on specific embodiments, and will not be described here.

406, decoding is performed by the decoding end one by one according to the coding manner of each group to obtain one or more coefficient blocks corresponding to the unit to be decoded.

In an implementation, the decoding process can specifically include: 1. the decoding end decodes according to a coding algorithm to obtain group parameters of each group. In an example, in an implementation, the decoding method of the group parameters can specifically include: the decoding end decodes according to at least one decoding manner corresponding to at least one of following coding manners to obtain the group parameters of each group: unary code, truncated unary code, truncated binary code, fixed-length coding, k-order exponential Golomb coding, truncated Rice coding, Huffman coding, or Golomb-Rice coding.

2. The decoding end decodes according to the group parameters of each group by using a semi fixed-length coding algorithm to obtain a plurality of coefficient values in each group, wherein the coefficient blocks corresponding to the unit to be decoded include the plurality of coefficient values in each group.

In an implementation, the decoding process can specifically include: 1. the decoding end decodes according to a fixed-length coding algorithm to obtain group Rice parameters of each group, or obtaining the group Rice parameters of each group according to a context model; 2. the decoding end decodes according to the group Rice parameters of each group by using a Golomb-Rice coding algorithm to obtain the plurality of coefficient values in each group, wherein the coefficient blocks corresponding to the unit to be decoded include the plurality of coefficient values in each group.

In an implementation, the decoding process can specifically include: 1. the decoding end obtains group Rice parameters of each group according to a context model; 2. the decoding end decodes according to a fixed-length coding algorithm or truncated unary code to obtain a group parameter deviation of each group; and obtains the group parameters of each group according to the group Rice parameters and the group parameter deviation of each group. In an example, the group parameters of each group can be updated according to the group Rice parameters and the group parameter deviation, specifically, group parameters=group Rice parameters+group parameter deviation.

3. The decoding end decodes according to the group parameters of each group by using the Golomb-Rice coding algorithm to obtain the plurality of coefficient values in each group, wherein the coefficient blocks corresponding to the unit to be decoded include the plurality of coefficient values in each group.

In an implementation, the decoding process can specifically include: 1. the decoding end decodes according to a fixed-length coding algorithm to obtain an order k of each group, or obtains the order k of each group according to a context model; 2. the decoding end decodes according to the order k of each group by using a k-order exponential Golomb coding algorithm to obtain a plurality of coefficient values in each group, wherein the coefficient blocks corresponding to the unit to be decoded include the plurality of coefficient values in each group.

In an implementation, the decoding process can specifically include: 1. the decoding end obtains an order k of each group according to a context model; 2. the decoding end obtains a group parameter deviation of each group a fixed-length coding algorithm or truncated unary code; and then updates the order k of each group according to the group parameter deviation. In an example, the order k of each group=the group parameter deviation+an original order k obtained from the context model.

3. Decoding is performed according to the updated order k of each group by using a k-order exponential Golomb coding algorithm to obtain a plurality of coefficient values in each group, wherein the coefficient blocks corresponding to the unit to be decoded include the plurality of coefficient values in each group.

In an implementation, the decoding process can specifically include: 1. the decoding end determines a coding manner of a current group according to at least one of the coefficients, the prediction manner, the quantization method or the transform manner of one or more groups obtained by decoding; 2. the decoding end decodes according to a decoding manner corresponding to the coding manner of the current group to obtain the coefficients of the current group, wherein the coding manner of the current group is a combination of several coding manners such as Golomb-Rice coding, k-order exponential Golomb coding, or semi fixed-length coding. The following will be introduced based on specific embodiments, and will not be described here.

In an implementation, in any of the above coding and decoding methods, at least two groups in the multiple groups of the coding unit have different coding manners.

407, one or more coefficients in each of the coefficient blocks in each group are recovered by the decoding end according to the scanning manner of the unit to be decoded to obtain one or more reconstructed data blocks corresponding to the unit to be decoded.

The decoding end recovers one or more coefficients in each of the coefficient blocks in each group one by one to be decoded to obtain one or more reconstructed data blocks corresponding to the unit to be decoded.

In an implementation, the scanning manner applicable to the embodiment of the present disclosure can include at least one of at least one of raster scanning, block scanning, horizontal scanning, vertical scanning, reciprocating scanning, diagonal scanning, inverse horizontal scanning, inverse vertical scanning or Hilbert scanning.

According to the above implementations of the present disclosure, the decoding end can derive different scanning manners and coefficient grouping manners according to different prediction manners, such coefficient grouping combines the prediction information, so that the grouped coefficients are more unified. For coefficients with little change, the coding end can allocate relatively small codewords for coding, and thus the coding manner is more flexible and the coding performance is improved. In addition, by designing a variety of fixed grouping modes, the method can better adapt to the semi fixed-length coding manner, and can flexibly select a better binarization method for each coding block, thereby reducing the complexity of coding algorithms.

Hereinafter, the technical solutions of the embodiments of the present disclosure will be explained in combination with several specific embodiments.

Embodiment 1: step 1, the decoding end determines a scanning manner of a unit to be decoded.

Step 2, the decoding end parses a grouping manner of the unit to be decoded according to n grouping manners preconfigured by a coding and decoding end or according to a code stream.

The grouping manner can include at least one of a fixed-length grouping manner or a semi fixed-length grouping based on a coefficient value size, or a grouping division based on coefficient arrangement positions.

Specifically, the fixed-length grouping manner refers to, for example, taking the whole unit to be coded as a group, or taking every four coefficients in the whole unit to be decoded as a group, or taking every three coefficients in the whole unit to be coded as a group. For example, the unit to be coded is a data unit with twelve rows and four columns, that is, a unit to be coded with 12×4. If the grouping manner of taking every four coefficients as a group is used, the unit to be coded with 12×4 can be divided into twelve groups; if the grouping manner of taking every three coefficients as a group is used, the unit to be coded with 12×4 can be divided into sixteen groups; and if the grouping manner of taking the whole unit to be coded as a group is used, the unit to be coded with 12×4 can be directly regarded as one group.

In an example, the grouping manner can also be a grouping division manner based on coefficient arrangement positions. Specifically, each coefficient in the whole unit to be coded can be evenly divided into two groups, three groups or four groups according to the arrangement positions. For example, the coefficients are divided into two groups in proportion, as an example, for the unit to be coded with 12×4, if the number of coefficients of the whole unit to be decoded is N=48 and the coefficients are divided into two groups according to a ratio of 1:1, the first twenty-four coefficients in the unit to be coded with 12×4 are divided into one group, and the remaining twenty-four coefficients are taken as another group.

In an example, the coefficients in the whole unit to be coded can also be unevenly divided into two groups, three groups or four groups according to the positions. For example, the coefficients are unevenly divided into three groups, and the ratio of division can be 2:1:1, that is, the coefficients from 1 to 24 arranged according to the arrangement positions in the unit to be coded with 12×4 can be taken as the first group; the coefficients from 25 to 36 can be taken as the second group, and the coefficients from 37 to 48 can be taken as the third group.

In an example, the grouping manner can also be a manner grouped based on the number of coefficients in each group. For example, every two adjacent coefficients in the whole unit to be coded are taken as a group, or every three adjacent coefficients are taken as a group, or every four adjacent coefficients are taken as a group.

In an example, the grouping manner can also be a manner of dividing as a group every a points based on the coefficient arrangement positions in the whole unit to be coded. For example, when a is 1, the coefficients at every one point in the coefficient positions in the whole unit to be coded can be taken as a group, and divided into two groups; when a is 2, the coefficients at every two points in the coefficient positions in the whole unit to be coded can be taken as a group, and divided into three groups.

In an example, the grouping manner can also be a grouping division manner based on a size of the coefficient values in the unit to be coded. Since the size of the coefficient values in the unit to be coded cannot be predicted, the number of coefficients in each group after performing the grouping division based on the size of the coefficient values is generally different, and thus the division manner can be referred to as the semi fixed-length grouping manner in the present disclosure.

For example, by grouping according to the size of the coefficient values, it can be determined whether each coefficient in the unit to be coded is greater than n, and then coefficients greater than or equal to n can be taken as a group, and coefficients less than n can be taken as a group.

The value of n can be pre-agreed by the coding end and the decoding end, or determined by information interaction, or also determined by decoding the code stream.

For example, the coding end and the decoding end can pre-agree a numerical value, for example, n=23. Alternatively, the decoding end can perform prediction according to the decoded reconstructed value or predicted value to determine the value n. Alternatively, the decoding end can perform prediction according to the decoded coefficient value to determine the value n.

For example, the decoding end can perform prediction according to the decoded reconstructed value or predicted value to determine the value parse from the code stream whether each coefficient value in each group of the current unit to be decoded is greater than the predicted value n, and then take coefficients greater than n as a group and take coefficients less than or equal to n as a group.

Further, in the above-mentioned various grouping manners, after grouping the coefficients in the unit to be coded, if there are a large number of coefficients in a certain group, secondary grouping can be performed. For example, if the coefficients in the unit to be coded are greater than n and the number of coefficients in the group is greater than the preset number of coefficients, the group can be grouped for the second time. Specifically, the secondary grouping manner can be a grouping manner based on any one of the above grouping manners or a combination of multiple grouping manners.

In an example, if the coefficients in the unit to be coded are transform coefficients, the grouping manner can also be expressed as: taking direct current (DC) component coefficients of a transform system in the whole unit to be coded as a group, and grouping alternating current (AC) component coefficients according to any one of the above grouping manners or a combination of multiple grouping manners.

Step 3, the decoding end decodes a parameter group_param of each group by using a fixed-length coding; and then, the decoding end decodes each coefficient value in each group one by one according to the parameter group_param of each group by using the fixed-length coding to obtain a coefficient block corresponding to the unit to be decoded.

Step 4, the decoding end recovers coefficients in the coefficient block according to the scanning manner of the unit to be decoded to obtain an original data block.

In an implementation, the coding end and the decoding end can be pre-agreed or configured with one or more of the above-mentioned grouping manners. In the process of video coding and decoding, the coding end selects one or more of the grouping manners to perform block coding according to the coefficients of the unit to be coded. The decoding end can determine the grouping manner through code stream analysis or signaling interaction with the coding end, or context prediction and derivation; and parse the code stream based on the determined grouping manner. In addition, the decoding end can also derive the grouping manner of coefficients in the current unit to be decoded according to the prediction direction, the prediction mode, or the transformation mode of different pixels in the unit to be decoded. Specific examples will be described below and will not be repeated here.

In an implementation, based on the fixed-length block coding manner or the semi fixed-length block coding manner in Embodiment 1, the parameter group_param of each group can be coded and decoded by using any one of the following coding manners or a combination of several coding manners.

1. Unary code: is a simple binaryzation method. Specifically, for a non-negative integer N, its unary code is represented as N 1s plus one 0.

2. Truncated unary code: is a variant of unary code. Specifically, when the maximum value of a symbol to be coded is known as N_max, assuming that a current symbol to be coded is a non-negative integer N, if N<N_max, the truncated unary code is the unary code; and if N=N_max, the truncated unary code is N 1s.

3. Truncated binary code: refers to calculating related variables (stage, num0, num1, thd, and the like) of val. For 0~(thd−1), a binary symbol string length thereof is a fixed-length code of stage, and for thd~val, its binary symbol string length thereof is a fixed-length code of (stage+1).

4. Fixed-length coding: refers to performing coding on coefficients to be coded by using a fixed code length, for example, ASCII codes coded with 8-bit binary numbers.

5. K-order exponential Golomb coding: k-order exponential Golomb coding includes prefix and suffix, and the coding method includes the following steps: 1) writing a number X in binary form, removing the lowest k bits, and then adding 1 to obtain T; 2) calculating the number of bits of T, and adding T−1 zeros in front; 3) adding the removed lowest k bits back to the end of the bit string.

6. Truncated Rice coding: truncated Rice coding includes prefix and suffix. Given a maximum upper limit cMax and a Rice parameter cRice, a symbol cVal to be coded is coded.

The specific coding process includes: (1) calculate prefix: prefix=cVal>>cRice, and perform binaryzation on prefix with cMax>>cRice as an upper limit by using truncated unary code; (2) calculate suffix: if cVal<cMax: suffix=cVal−prefix<<cRice; and if cVal>=cMax: no suffix suffix. The suffix is calculated based on a fixed-length coding, and the number of digits is cRice. According to the calculation process, when cRice=0, the truncated Rice coding is equivalent to the truncated unary code, where a symbol >> represents right shift operation, and a symbol << represents left shift operation.

7. Huffman coding: refers to counting the frequency of all the coefficients, building a Huffman tree, assigning relatively short codewords to coefficients with relatively high probability, and assigning relatively long codewords to coefficients with relatively low probability.

8. Golomb-Rice coding: Golomb-Rice is a variant of Golomb coding. Compared with Golomb coding, a restriction condition of a parameter m is that m must be a power of 2. Specifically, the parameter m is initialized, and m must be the power of 2; q and r are calculated, where q=N/m, and r=N&(m−1), q is coded by using unary code, and a low log 2(m) bit of the binary bit of r is taken as a codeword of r.

In addition, the following combined decoding solutions can be obtained by combining fixed-length coding with truncated unary code.

Solution 1: a solution similar to truncated unary code is used. For prefixes greater than (N−1)>>1, truncated unary code starting with 1 and ending with 0 is used; and for prefixes less than (N−1)>>1, truncated unary code starting with 0 and ending with 1 is used.

Solution 2: for prefixes greater than (N−1)>>1, truncated unary code starting with 1 and ending with 0 is used; and for prefixes less than (N−1)>>1, fixed-length coding starting with 0 is used.

Solution 3: for prefixes greater than (N−1)>>1, fixed-length coding starting with 1 is used; and for prefixes less than (N−1)>>1, truncated unary code starting with 0 and ending with 1 is used.

Solution 4: a solution similar to truncated unary code is used. For prefixes greater than (N−1)>>1, truncated unary code starting with 0 and ending with 1 is used; and for prefixes less than (N−1)>>1, truncated unary code starting with 1 and ending with 0 is used.

Solution 5: for prefixes greater than (N−1)>>1, truncated unary code starting with 0 and ending with 1 is used; and for prefixes less than (N−1)>>1, fixed-length coding starting with 1 is used.

Solution 6: for prefixes greater than (N−1)>>1, fixed-length coding starting with 0 is used; and for prefixes less than (N−1)>>1, truncated unary code starting with 1 and ending with 0 is used.

In addition, in an implementation, the coding end can also code the grouping manner based on the above coding manners. That is, based on various semi fixed-length grouping manners in Embodiment 1, the coding end and the decoding end can be configured with n grouping manners, and then the coding end can code the unit to be coded according to the configuration by using one of the coding manners, so that the decoding end can derive the grouping manner used by the unit to be decoded based on the code stream, and further decode based on the grouping manner.

In an implementation, based on the above semi fixed-length block decoding in Embodiment 1, the prediction value can be derived in combination with the context model and further decoded. Specifically, for the group parameter group_param of each group in the unit to be decoded, a predicted value group_param_pred can be derived from the context first, and then a difference value group delta between a real group_param and the predicted group_param_pred can be solved by using the decoding manner in the previous embodiment, and the group parameter of each group in the unit to be decoded can be obtained according to group_param=group_param_pred+group_delta. Then, all the coefficients of each group are decoded according to the group parameters and decoding algorithm.

In an implementation, when the coding end needs to perform fixed-length coding on the coefficients of semi fixed-length coding, for relatively large coefficients, the coding end can directly code original pixel values with fixed-length coding, or directly code the reconstructed pixel values with fixed-length coding.

For example, if a bit width of the original pixel value is 8, when a coding bit width of a coefficient group is group_param>=6, or the coding bit width of the coefficient group is group_param>=7, the original pixel value or the reconstructed pixel value can be directly coded with a fixed-length coding of 8, thereby improving the performance of coding and decoding.

In an implementation, the grouping manner of the unit to be decoded determined by the decoding end can also be that the grouping manner of the coefficients in the current unit to be decoded can be derived according to the prediction direction, the prediction mode, or the transformation mode of different pixels in the unit to be decoded.

Specifically, the decoding end can derive the grouping manner and the coding manner of the coefficients in the unit to be decoded according to the prediction mode.

For example, a first column currently uses a prediction mode, and all subsequent columns are horizontal prediction modes. A first point can directly transmit an original value or be predicted by a reconstructed value of a previous block. As shown in FIG. 5, taking a unit to be decoded with 16×4 as an example, if a residual obtained based on the current prediction solution is predicted as shown in the following FIG. 5, all residual values in the first column are regarded as one group. A residual value of each row in remaining coefficient blocks with 15×4 is regarded as one group, and the number of coefficients in the first group is relatively small, therefore, the grouping is not continued, and the remaining coefficients are allowed to be smaller in each group.

Therefore, the scanning order of the whole block is to first scan vertically to obtain a first group of coefficients and code the first group of coefficients; and then scan horizontally to obtain a second group of coefficients, which can be divided into smaller groups from left to right, and different coding solutions can be used in each group. The first group in the second group uses semi fixed-length coding, according to the size of the prefix value used in the first group, if the prefix is less than a certain threshold, the coefficient of the latter group is coded by using Golomb-Rice; and if the prefix is greater than the certain threshold, the coefficient of the latter group is coded by using k-order Golomb, where the k value is derived from the residual value of the former group.

In addition, the decoding end can derive the grouping manner and the coding manner of the coefficients in the unit to be decoded according to the transformation mode.

For example, the coding end can code the transform coefficients according to the specific positions of the DC coefficients. All DC coefficients can be grouped together, and all AC coefficients can be grouped together. When the number of the DC coefficients is relatively large, the DC coefficient group can be grouped again; and when the number of AC coefficients is relatively large, the AC coefficient group can be grouped again.

Specifically, since the DC coefficient values are relatively large in most cases, more flexible coding solutions can be used for the DC coefficients, for example, using k-order exponential Golomb coding with relatively fine grouping. When the amplitudes of the DC coefficients are similar, the coefficient prediction is performed on the DC coefficients, and the first DC coefficient is coded by using k-order exponential Golomb coding, and the remaining DC coefficients only need to code the DC coefficient symbol and the difference with the first DC coefficient. The coding of the difference of the DC coefficients can use semi fixed-length coding.

Specifically, in general, the coefficient values of the AC coefficients are relatively small, and thus the whole AC coefficients can be used as a group, and semi fixed-length coding can be used; or, the AC coefficients can be divided into two groups (for example, the upper-right corner and the lower-left corner are regarded as one group, and the lower-right corner is regarded as one group), and each of the two groups uses semi fixed-length coding. However, when the amplitudes of the AC coefficients is relatively large, the AC coefficients in the upper-right corner and the lower-left corner can be grouped by 2 to 3 coefficients and Golomb-Rice coding can be used, and semi fixed-length coding can be used for the lower-right corner.

The scanning order of the unit to be coded can be as follows: first, the whole block is divided into DC coefficients and AC coefficients. As shown in FIG. 6, taking a unit to be coded with 16×4 as an example, the coefficient distribution after transformation may be as shown in FIG. 6. In the DC coefficients, if the whole DC coefficients are coded as a group, then raster scanning is used for the DC coefficients; otherwise, Hilbert scanning is used to code the coefficients with close distance together. In the AC coefficients, if all AC coefficients are taken as a group, the AC coefficients are directly scanned by using raster scanning; otherwise, the AC coefficients are scanned in the order of upper-right corner, lower-left corner and lower-right corner, and the coefficients inside the three corners are scanned sequentially by using raster scanning.

In another embodiment, taking a unit to be coded with 16×4 as an example, the coefficient distribution after transformation may be as shown in FIG. 7. The coefficients are divided into two blocks, and the transformation is performed in each of the two blocks. As shown in FIG. 7, if there are only two DC coefficients, there are the following groups: 1. two DC coefficients are directly taken as a group, and all AC coefficients are divided into a group; and the scanning order is to use raster scanning for each 8×4.

2. Two DC coefficients are directly taken as a group, and all AC coefficients are divided into two groups, and each 8×4 is a group (excluding DC coefficients); and the scanning order is to use raster scanning for each 8×4.

3. Two DC coefficients are directly taken as a group, and all AC coefficients are divided into four groups, each 4×4 is a group (excluding DC coefficients), and raster scanning is used in each 4×4.

4. Two DC coefficients are directly taken as a group, and all AC coefficients are divided into eight groups (within 8×4, every two columns are a group), and vertical scanning is used.

Based on any of the above grouping manners, in an example, the coding end can code the DC coefficients by using k-order exponential Golomb coding and code the AC coefficients by using semi fixed-length coding.

Embodiment 2: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end decodes a Rice parameter CRice of each group by using a fixed-length code, and then decodes each coefficient value in the group by using Golomb-Rice.

Step 4, the decoding end recovers coefficients in the coefficient block according to the scanning manner of the unit to be decoded to obtain an original data block.

Embodiment 3: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3. the decoding end estimates a Rice parameter CRice of each group according to the context, and then decodes each coefficient value in the group by using Golomb-Rice.

Step 4, the decoding end recovers coefficients in the coefficient block according to the scanning manner of the unit to be decoded to obtain an original data block.

Embodiment 4: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end estimates the Rice parameter CRice of each group according to the context, then decodes a parameter deviation C of each group by using a fixed-length code, and updates an original Rice parameter CRice+C to the Rice parameter CRice, that is, CRice=C. Then, each coefficient value in the group is decoded by using Golomb-Rice.

Step 4, the decoding end recovers coefficients in the coefficient block according to the scanning manner of the unit to be decoded to obtain an original data block.

Embodiment 5: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end determines a Rice parameter CRice of each group, and then decodes each coefficient value in the group by using Golomb-Rice coding.

The decoding end can derive the Rice parameter CRice based on the code stream, and the specific decoding method can be any one of the aforementioned Embodiment 1, for example, a decoding process of unary code, truncated unary code, truncated binary code, fixed-length coding, k-order exponential Golomb coding, truncated Rice coding, Hoffman coding, Golomb-Rice coding, or the like. According to sizes of the coefficient values, the decoding end decodes the code stream by combining the fixed-length code with the truncated unary code to obtain group parameters of each group, which will not be repeated here.

Step 4, the decoding end recovers coefficients in the coefficient block according to the scanning manner of the unit to be decoded to obtain an original data block.

Embodiment 6: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end estimates the Rice parameter CRice of each group according to the context, then decodes a parameter deviation C of each group by using a fixed-length code, the Rice parameter CRice+=C. Then, each coefficient value in the group is decoded by using Golomb-Rice coding.

The decoding solution of the parameter deviation C can be any one of the aforementioned Embodiment 1, for example, a decoding process of unary code, truncated unary code, truncated binary code, fixed-length coding, k-order exponential Golomb coding, truncated Rice coding, Hoffman coding, Golomb-Rice coding, and the like. According to sizes of the coefficient values, the decoding end decodes the code stream by combining the fixed-length code with the truncated unary code to obtain group parameters of each group, which will not be repeated here.

Step 4, the decoding end recovers coefficients in the coefficient block according to the scanning manner of the unit to be decoded to obtain an original data block.

Embodiment 7: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end decodes an order k of each group by using a fixed-length code, and then decodes each coefficient value in the group by using k-order exponential Golomb.

Step 4, the decoding end recovers coefficients in the coefficient block according to the scanning manner of the unit to be decoded to obtain an original data block.

Embodiment 8: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, the decoding end estimates an order k of each group according to the context, and then decodes each coefficient value in the group by using k-order exponential Golomb.

Step 4, the decoding end recovers coefficients in the coefficient block according to the scanning manner of the unit to be decoded to obtain an original data block.

Embodiment 9: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3. the decoding end estimates an order k of each group according to the context, then decodes a parameter deviation C of each group by using a fixed-length code, and updates an original order k+C to the order k, that is, k+=C. Then, each coefficient value in the group is decoded by using k-order exponential Golomb.

Step 4, the decoding end recovers coefficients in the coefficient block according to the scanning manner of the unit to be decoded to obtain an original data block.

Embodiment 10: step 1, the decoding end determines a scanning manner of a unit to be decoded.

Step 2, the decoding end parses a grouping manner of the unit to be decoded according to n fixed grouping manners pre-configured by a coding and decoding end or according to a code stream.

Step 3, The decoding end determines the order k of each group, and then decodes each coefficient value in the group by using k-order exponential Golomb.

The decoding end can derive the order k based on the code stream, and the specific decoding method can be any one of the aforementioned Embodiment 1, for example, a decoding process of unary code, truncated unary code, truncated binary code, fixed-length coding, k-order exponential Golomb coding, truncated Rice coding, Hoffman coding, Golomb-Rice coding, and the like. According to sizes of the coefficient values, the decoding end decodes the code stream by combining the fixed-length code with the truncated unary code to obtain group parameters of each group, which will not be repeated here.

Step 4, the decoding end recovers coefficients in the coefficient block according to the scanning manner of the unit to be decoded to obtain an original data block.

Embodiment 11: step 1, the decoding end calculates a pixel gradient in a certain direction by using reconstructed pixel values around; and can calculate a gradient value according to a prediction direction of a current pixel; or calculate gradient values in horizontal and vertical directions according to experience, and then quantize the gradient.

Step 2, the decoding end estimates a value range of a current coefficient according to the context, and estimates a value of a Rice coefficient k of Golomb-Rice or a value of an order k of exponential Golomb according to the value range.

Embodiment 12: step 1, the coding end estimates a value range of a current coefficient according to the context, and selects a coding manner according to the value range.

Step 2, the coding end codes the current coefficient by using the corresponding Golomb coding method.

For example, when a range of absolute values of the estimated coefficients is greater than or equal to $2^5$, the k value of the Golomb-Rice coding is estimated, and then the current coefficient is coded by using Golomb-Rice coding. When the range of absolute values of the estimated coefficients is less than $2^5$, the k value of the exponential Golomb is estimated, and then the current coefficient is coded by using exponential Golomb coding.

Alternatively, in an example, when a range of absolute values of the estimated coefficients is greater than $2^5$, the k value of the exponential Golomb coding is estimated, and then the current coefficient is coded by using exponential Golomb coding. When the range of absolute values of the estimated coefficients is less than or equal to $2^5$, the k value of the Golomb-Rice is estimated, and then the current coefficient is coded by using Golomb-Rice coding.

Further, the value range of the coefficients can also take other positive integer values according to empirical values, which is not specifically limited in the embodiment of the present disclosure.

Embodiment 13: step 1, the coding end estimates a value of a current coding coefficient according to the context.

For example, if a true value is greater than the current estimated value, it is coded as 1; otherwise, it is coded as 0. The coding values 0 and 1 correspond to one coding manner, respectively.

Step 2, the coding end codes the current coefficient by using the corresponding Golomb coding method.

For example, 1 corresponds to exponential Golomb coding, and 0 corresponds to Golomb-Rice coding. When the obtained coding value is 1, the k value of exponential Golomb coding is estimated according to the context, and then the current coefficient is coded by using exponential Golomb coding. When the obtained coding value is 0, the k value of Golomb-Rice is estimated, and then the current coefficient is coded by using Golomb-Rice coding.

Alternatively, in an example, when the obtained coding value is 0, the k value of Golomb-Rice coding is estimated according to the context; otherwise, the k value of exponential Golomb is estimated; and then the current coefficient is coded by using the corresponding Golomb coding method.

Embodiment 14: step 1, when coding the coefficients, the coding end derives an estimated value n of the current coding coefficient according to the context, and reads out from the code stream whether the current coding coefficient is less than n.

Step 2, for coefficients less than n, the coding end codes by using a fixed-length code; for coefficients greater than n, the coding end estimates a k value, decodes by using exponential Golomb or Golomb-Rice, and adds n to the decoded values.

Embodiment 15: step 1, when performing block coding on residual coefficients, the coding end derives an estimated value n according to the context, and divides the coefficients to be coded into two groups according to the estimated value n.

Step 2, for coefficients less than n, the coding end decodes by using a fixed-length code; for coefficients greater than n, the coding end estimates a k value, decodes by using exponential Golomb or Golomb-Rice, and adds n to the decoded values.

Alternatively, for parameters less than n, the coding end estimates a k value, and decodes by using exponential Golomb; for coefficients greater than n, the coding end estimates a k value, decodes by using Golomb-Rice, and adds n to the decoded values.

Alternatively, for parameters less than n, the coding end estimates a k value, and decodes by using Golomb-Rice; for coefficients greater than n, the coding end estimates a k value, decodes by using exponential Golomb, and adds n to the decoded values.

Embodiment 16: step 1, when performing block coding on residual coefficients, the coding end derives an estimated value n according to the context, reads out a corrected value delta by using truncated unary code in the code stream; and updates the value of n to n+=delta according to delta. The coefficients in the unit to be decoded are divided into two groups according to the value of n.

Step 2, for coefficients less than n, the coding end decodes by using a fixed-length code; for coefficients greater than n, the coding end estimates a k value, decodes by using exponential Golomb or Golomb-Rice, and adds n to the decoded values.

Alternatively, for parameters less than n, the coding end estimates a k value, and decodes by using exponential Golomb; for coefficients greater than n, the coding end estimates a k value, decodes by using Golomb-Rice, and adds n to the decoded values.

Alternatively, for parameters less than n, the coding end estimates a k value, and decodes by using Golomb-Rice; for coefficients greater than n, the coding end estimates a k value, decodes by using exponential Golomb, and adds n to the decoded values.

Embodiment 17: step 1, the coding end parses whether to turn on a run-length coding mode from a code stream according to context information.

Specifically, if there are a plurality of consecutive equal values in coding coefficients or the reconstructed data, the run-length coding mode is turned on; otherwise, the run-length coding mode is turned off, and any of the above coding solutions is directly used.

For example, the context information can include one of the following descriptions: a) the size of the gradient or the sum of gradients in all directions of the decoded reconstructed pixel values; b) the size of the gradient or the sum of gradients in all directions of adjacent predicted pixel values; c) the size of the gradient or the sum of gradients in all directions of the decoded coefficients; d) the size weighting of the sum of two gradients in a, b or c; e) the size weighting of the sum of three gradients in a, b or c.

Embodiment 18: since the code length of semi fixed-length coding is related to the grouping manner and the number of coefficients in the group, the compression ratio or coding performance of the coding end will be quite different while performing coding according to different prediction solutions or different image contents. Therefore, it is necessary to agree on a better grouping manner in advance, for example, a fixed size grouping manner.

When decoding various fixed block partitions, a block partitioning method of the current coding unit can be decoded first, and then decoding is performed according to a fixed partitioning method. The following will be described in combination with accompanying drawings and specific embodiments.

For example, the unit to be coded can be divided into a plurality of 2×2 blocks as a coding group. Taking a unit to be coded with 16×4 as an example, and a critical limit (CL) is shared in the group. Semi fixed-length coding is used, and a first CL value is coded by using a fixed-length coding with a code length of 3 or 4 (related to the image bit width N). A second CL value is a difference of CL obtained based on context prediction, which is coded by using truncated unary code. The maximum length of truncated unary code is N−1.

As shown in FIG. 8, the unit to be coded with 16×4 is grouped into 16 blocks as shown in (1) in FIG. 8 according to a grouping manner of dividing them into 2×2 blocks. Between each 2×2 block, scanning is performed according to the Hilbert scanning manner. For example, the scanning order of the coding end to the unit to be coded can be as shown in (2) in FIG. 8, and scanning is performed according to the number sequence of 0 to 15.

Raster scanning can be performed inside each CL, that is, the scanning sequence inside each 2×2 block can be as shown in (3) in FIG. 8, and scanning is performed according to the number sequence of 0 to 3.

Context prediction can be used between CLs. $CL_0$ is directly coded by using the fixed-length code, $CL_1 = (CL_1 -$ $CL_0$), and $CL_1$ is coded by using truncated unary code; and $CL_n=(CL_n-(CL_{n-2}+CL_{n-1}*3>>2))$, and $CL_n$ is coded by using truncated unary code.

The reconstructed values of $CL_{n-2}$ and $CL_{n-1}$ is detected. If all the reconstructed values in $CL_{n-2}$ and $CL_{n-1}$ are equal or almost equal, it is determined whether the current 2×2 block directly reuses the previous reconstructed values in $CL_{n-2}$ and $CL_{n-1}$. In an example, run-length coding can also be directly used to code the inside of the current coding block, and the number of 2×2 blocks of the coded reconstructed values can be directly used. A fixed-length code can be used to code the number, the code length of the fixed-length code is determined according to the number of uncoded CL in the current coding unit. Since there are at most fifteen uncoded units, the maximum length of the fixed-length code is 4 bits.

In another implementation, as shown in FIG. 9, the unit to be coded can be divided into a plurality of 4×1 blocks. Taking the unit to be coded with 16×4 as an example, the unit to be coded with 16×4 can be grouped into 16 blocks as shown in FIG. 9 according to a grouping manner of dividing them into 4×1 blocks.

The coding methods of multiple components (luminance values or chrominance values) of image data can be consistent or inconsistent.

In an example, the coding end can divide the fixed block of the unit to be coded in the following partitioning manners: 2×1, 1×2, 1×4, 2×4, 4×2, 2×8, 2×16, 4×4, 8×4, or 16×4, or the like. The present disclosure does not impose specific limitations on the division method.

For example, taking the decoding of a fixed block with 2×2 as an example, the decoding process at the decoding end mainly includes the following steps.

1) If the current block is a first block, a CL value of the 0th block is decoded by using a fixed-length code, four coefficient values are solved by using the fixed-length code according to the CL value, and positions of the four coefficient values are stored in the first block with 2×2 in the order of raster scanning.

2) If the current block is not the first block, it is determined whether the reconstructed values of the previous blocks are equal or whether one or more CL values are 0 (whether the first one or two CL values are 0), if the first two CL values are 0, a flag is parsed, that is, whether the previous coefficient value or the reconstructed value is directly used in the current block. If the previous coefficient value or the reconstructed value is directly used in the current block, the current block is not parsed; and if the previous coefficient value or the reconstructed value is not directly used in the current block, it is counted in Step 3 to continue decoding.

3) If the current block is not the first block, a residual value between the CL value of the current block and the CL value of the previous block is decoded by using truncated unary code to obtain the CL value of the current block, and the four coefficient values in the block are solved by using the fixed-length code. Each 2×2 block is stored in sequence according to the order of Hilbert scanning.

It should be noted that the unit to be coded with 16×4 needs to parse sixteen 2×2 blocks. If the CL value of the current group is greater than or equal to the image bit width, the current group directly codes the original value or the reconstructed value.

Embodiment 19: hereinafter, a case of decoding a block partitioning method with a non fixed size will be explained in combination with specific embodiments.

Step 1, a prediction solution of a previous block is derived to obtain a prediction mode of each pixel in a current block, and grouping is performed according to the prediction mode.

Step 2, if grouping is performed on pixels when the current block is predicted, the current block is grouped according to a prediction grouping solution; otherwise, if the current block is predicted directly point by point, the current block can be grouped according to a prediction direction of each point.

Step 3, decoding is performed on coefficients in each group according to a prediction order, if the prediction order is from upper-left to lower-right, the grouped coefficients are decoded in the same order; and if the prediction order is from left to right, the grouped coefficients are decoded in the same order.

Step 4, it is derived whether transform coding is used by each group.

Step 5, if the transform coding is used in the current group, and if the current group is a first group, k-order Golomb decoding is used for a DC coefficient according to empirical values or the order k derived from the previous coding block; and if the current group is not the first group, the DC coefficient k of the current group is estimated according to the DC coefficient value of the previous group, and k-order Golomb decoding is used.

1) For the remaining coefficients, if the DC coefficient value is greater than a threshold, it is parsed from the code stream whether the last ½ coefficients (that is, the high-frequency coefficients) of the current group are all 0. If the last ½ coefficients of the current group are all 0, the number of the remaining coefficients of the current group except the DC coefficient and the coefficient of 0 are taken as the number of coefficients to be coded.

2) If the number of coefficients is less than 3, Golomb-Rice coding is used for the remaining coefficients. The first coding coefficient derives Rice coefficient C according to the quantization step size and DC coefficient value, and Golomb-Rice decoding is used. The latter coefficients derive Rice coefficient C according to the size of the previous coefficient value, and Golomb-Rice decoding is used. Otherwise, if the number of coefficients is greater than 3, semi fixed-length coding is used; if there is nonzero in the last ½ coefficients (that is, the high-frequency coefficients) of the previous group, processing is performed according to 2).

3) It is parsed whether the last ¼ coefficients (that is, high-frequency coefficients) of the current group are all 0 from the code stream. If the last ¼ coefficients are all 0, all the coefficients except the DC coefficient and the last ¼ coefficients are processed according to 2); otherwise, all the coefficients except the DC coefficient are processed according to 2). If the DC coefficient value is less than the threshold, processing is performed according to 3).

Step 6, if the transform coding is not used in the current group, for the coefficients in the group, the quantization step size of the coefficients in the current group is derived, and decoding is performed according to the quantization step size and the coefficient values in the previous group in the time domain.

1) First, a mean value of the absolute values of the coefficients in the current group is estimated; 2) then, comparison results between the absolute values of all the coefficients in the current group with the estimated mean value are decoded, and secondary grouping is performed according to the comparison results, wherein coefficients greater than the mean value is taken as one group, and coefficients less than or equal to the mean value is taken as the other group; 3) after the second grouping, according to the number of coefficients in the group, if the number of coefficients in the group less than the mean value is greater than or equal to 4, semi fixed-length decoding is used; otherwise, Golomb-Rice decoding is used for the coefficients in the group less than the mean value.

For the coefficients in the group greater than the mean value, if the number of coefficients is greater than 4 and the estimated mean value is less than the threshold, semi fixed-length decoding is used; otherwise, k-order exponential Golomb decoding is used. The k value and the C value can be estimated based on the estimated mean value, or obtained by parsing a parameter at the decoding end based on the estimated mean value.

Embodiment 20: step 1, after determining the grouping manner, the decoding end determines whether the number x of coefficients in the current group is greater than a threshold m. For example, m=30 and x=32, it is determined that the number x of coefficients in the current group is greater than the threshold m.

Step 2, the decoding end parses at most n positions from the code stream, where the n positions represent positions of n points (for example, n=2) with abnormal values (coefficients with relatively large amplitude in the group) in the current group. The position coding is decoded by using a fixed-length code, and the code length is related to the size of the x value (if x=32, the code length is 5).

Step 3, the decoding end decodes coefficient values of other positions in the current group.

The methods for decoding the coefficient values of other positions in the current group can include semi fixed-length decoding, exponential Golomb decoding, Golomb-Rice decoding, or Huffman decoding mentioned above.

Step 4, the decoding end decodes the abnormal values by using k-order exponential Golomb decoding, and the decoded amplitude is added with the maximum amplitude of the coefficient values in other positions as the amplitude of an abnormal point.

Embodiment 21: step 1, after determining the grouping manner, the decoding end determines whether the number x of coefficients in the current group is greater than a threshold m. For example, m=30 and x=32, it is determined that the number x of coefficients in the current group is greater than the threshold m.

Step 2, the decoding end decodes the maximum amplitude in the current group by using the fixed-length code, and decodes the minimum amplitude in the current group by using the fixed-length code according to the value of the maximum amplitude. According to the range of maximum amplitude and minimum amplitude, all the coefficients in the current group are decoded.

Specifically, if the maximum amplitude is equal to the minimum amplitude, the coefficients of the whole group need not be decoded; if the difference between the maximum amplitude and the minimum amplitude is 1, then each coefficient in the whole group only needs a 1-bit fixed-length code to decode and if the difference between the maximum amplitude and the minimum amplitude is less than n (for example, n=15), the coefficients at other positions in the current group can be decoded by using a fixed-length code. For example, when n=15, a 4-bit fixed-length code can be used for decoding.

If a difference between the maximum amplitude and the minimum amplitude is greater than n, an appropriate order k is selected according to the difference, and coefficients in the current group are decoded by using k-order exponential Golomb.

It should be noted that various embodiments in the above embodiments of the present disclosure can be combined with each other. For example, a variety of different grouping manners in Embodiment 1 can be applied to other embodiments, and different coding and decoding algorithms in Embodiment 2 can also be applied to other embodiments, and a variety of different coding and decoding algorithm times can be combined as needed.

Figure 10:
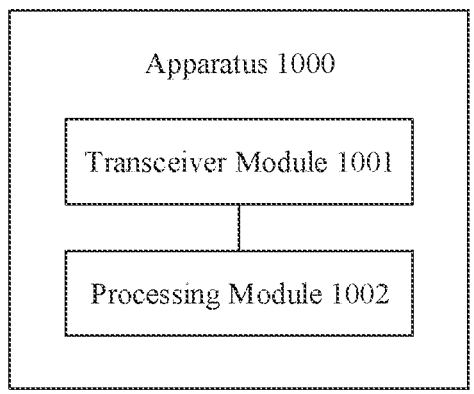
FIG. 10 is a schematic structural diagram of a video coding and decoding apparatus according to an embodiment of the present disclosure.

Based on the above embodiments, the present disclosure further provides a video coding apparatus and a video decoding apparatus corresponding to the video coding apparatus, which are collectively referred to as a video coding and decoding apparatus in the present disclosure. Referring to the aforementioned FIG. 1 to FIG. 3, as shown in FIG. 10, the apparatus 1000 can include a transceiver module 1001 and a processing module 1002.

The transceiver module 1001 can be configured to obtain a code stream of a unit to be decoded.

The processing module 1002 can be configured to determine a scanning manner and a grouping manner of the unit to be decoded, and a coding manner corresponding to each group; decode according to the coding manner of each group to obtain one or more coefficient blocks corresponding to the unit to be decoded; and recover one or more coefficients in each of the coefficient blocks in each group one by one according to the scanning manner of the unit to be decoded to obtain one or more reconstructed data blocks corresponding to the unit to be decoded.

In an implementation, the grouping manner includes al least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, each of the reconstructed data blocks is a data block including one of original pixel values of an image to be decoded, residual values obtained by predicting the original pixel values, coefficients obtained by quantizing the residual values, or transform coefficients obtained by transforming the residual values.

In an implementation, the processing module 1002 is configured to determine at least one of the scanning manner and the grouping manner of the unit to be decoded and the coding manner corresponding to each group according to the pre-agreement of a coding end and the decoding end or context information; or obtain at least one of the scanning manner and the grouping manner of the unit to be decoded and the coding manner corresponding to each group by parsing the code stream; or obtain the grouping manner according to a prediction manner, a quantization manner and/or a transform manner of the unit to be decoded.

In an implementation, the processing module 1002 is configured to decode according to a coding algorithm to obtain group parameters of each group; and decode according to the group parameters of each group by using a semi fixed-length coding algorithm to obtain a plurality of coefficient values in each group, wherein the coefficient blocks corresponding to the unit to be decoded include the plurality of coefficient values in each group.

In an implementation, the processing module 1002 is configured to decode according to at least one decoding manner corresponding to at least one of following coding manners to obtain the group parameters of each group: unary code, truncated unary code, truncated binary code, fixed-length coding, k-order exponential Golomb coding, truncated Rice coding, Huffman coding, or Golomb-Rice coding.

In an implementation, the processing module 1002 is configured to decode according to a fixed-length coding algorithm to obtain group Rice parameters of each group, or obtain the group Rice parameters of each group according to a context model; decode according to the group Rice parameters of each group by using a Golomb-Rice coding algorithm to obtain the plurality of coefficient values in each group, wherein the coefficient blocks corresponding to the unit to be decoded include the plurality of coefficient values in each group.

In an implementation, the processing module 1002 is configured to obtain group Rice parameters of each group according to a context model; decode according to a fixed-length coding algorithm or truncated unary code to obtain a group parameter deviation of each group; obtain the group parameters of each group according to the group Rice parameters and the group parameter deviation of each group; and decoding according to the group parameters of each group by using the Golomb-Rice coding algorithm to obtain the plurality of coefficient values in each group, wherein the coefficient blocks corresponding to the unit to be decoded include the plurality of coefficient values in each group.

In an implementation, the processing module 1002 is configured to decode according to a fixed-length coding algorithm to obtain an order k of each group, or obtaining the order k of each group according to a context model; and decode according to the order k of each group by using a k-order exponential Golomb coding algorithm to obtain a plurality of coefficient values in each group, wherein the coefficient blocks corresponding to the unit to be decoded include the plurality of coefficient values in each group.

In an implementation, the processing module 1002 is configured to obtain an order k of each group according to a context model; obtain a group parameter deviation of each group a fixed-length coding algorithm or truncated unary code; updating the order k of each group according to the group parameter deviation; and decode according to the updated order k of each group by using a k-order exponential Golomb coding algorithm to obtain a plurality of coefficient values in each group, wherein the coefficient blocks corresponding to the unit to be decoded include the plurality of coefficient values in each group.

In an implementation, the processing module 1002 is configured to determine a coding manner of a current group according to at least one of the coefficients, the prediction manner, the quantization method or the transform manner of one or more groups obtained by decoding; and decode according to a decoding manner corresponding to the coding manner of the current group to obtain the coefficients of the current group, wherein the coding manner of the current group is a combination of several coding manners such as Golomb-Rice coding, k-order exponential Golomb coding, or semi fixed-length coding.

In an implementation, among a plurality of groups of one or more coding units, two or more groups have different coding manners.

In an implementation, in response to a decoding manner of the unit to be decoded being any one of Golomb-Rice coding or k-order exponential Golomb coding, the processing module 1002 is configured to obtain the grouping manner of the unit to be decoded according to a prediction manner, a quantization method and/or a transform manner of the unit to be decoded.

Correspondingly, the present disclosure provides a video coding apparatus. As shown in FIG. 10, the video coding apparatus includes a transceiver module 1001 and a processing module 1002.

The processing module 1002 is configured to scan one or more data blocks to be coded in an original image according to a first scanning manner to obtain a coefficient sequence; grouping the coefficient sequence according to a first grouping manner to obtain a plurality of groups of subsequences to be coded; and determining a coefficient coding manner corresponding to each of the plurality of groups of subsequences to be coded, and encoding the subsequences to be coded one by one to obtain a coded code stream.

The transceiver module 1001 is configured to transmit the coded code stream to a decoding end.

In an implementation, the grouping manner includes at least one of a fixed-length grouping manner or a semi fixed-length grouping based on a coefficient value size, or a grouping division based on coefficient arrangement positions.

In an implementation, the coding manner includes at least one of unary code, truncated unary code, truncated binary code, fixed-length coding, semi fixed-length coding, k-order exponential Golomb coding, truncated Rice coding, Hoffman coding, or Golomb-Rice coding.

In an implementation, the scanning manner includes at least one of raster scanning, block scanning, horizontal scanning, vertical scanning, reciprocating scanning, diagonal scanning, inverse horizontal scanning, inverse vertical scanning or Hilbert scanning.

In an implementation, each of the data blocks to be coded is a data block composed of one of original pixel values of an image to be decoded, residual values obtained by predicting the original pixel values, coefficients obtained by quantizing the residual values, or transform coefficients obtained by transforming the residual values.

Specifically, the video coding and decoding apparatus provided by the present disclosure can be realized by the coder and the decoder shown in FIG. 2 and FIG. 3 to form the coding and decoding system as shown in FIG. 1. The schematic diagram of the internal structure of the apparatus is shown in FIG. 1 to FIG. 3, which will not be repeated here.

For the electronic device provided by the embodiment of the present disclosure, the electronic device can be a notebook computer, a tablet computer, a desktop computer, a portable computer, and the like, and the embodiment of the present disclosure does not limit this.

Figure 11:
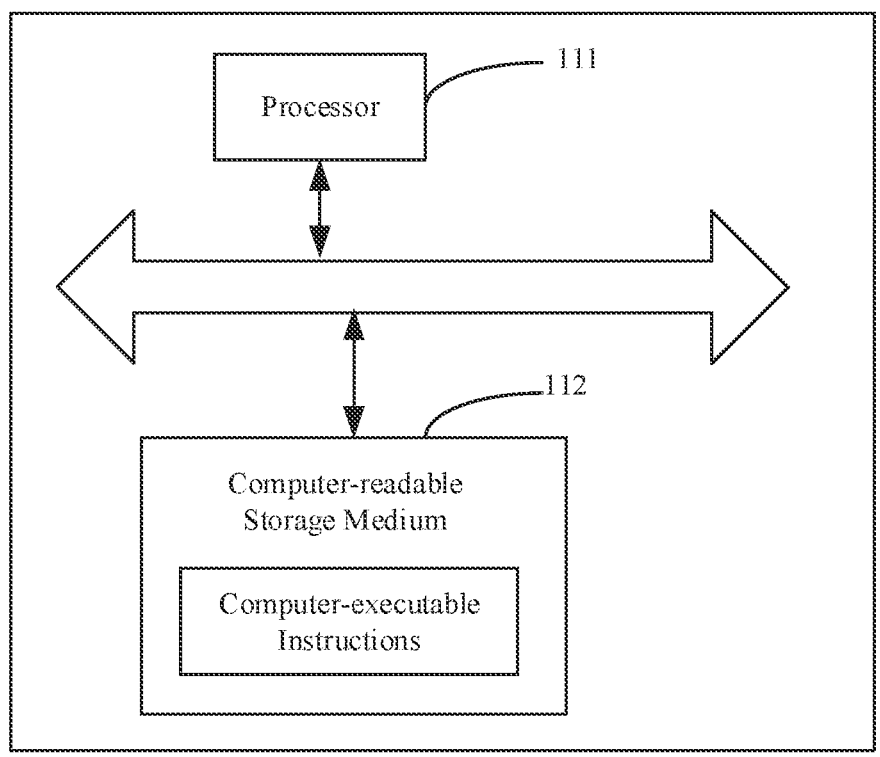
FIG. 11 is a hardware structural diagram of an electronic device according to an embodiment of the present disclosure.

FIG. 11 is a hardware structural diagram of an electronic device according to an embodiment of the present disclosure. As shown in FIG. 11, the electronic device includes a processor 111 and a computer-readable storage medium 112. The computer-readable storage medium 112 stores computer-executable instructions executable by the processor 111, and the processor 111 is configured to execute the computer-executable instructions to implement the method disclosed in any of the above embodiments of the present disclosure.

For example, the processor 111 is configured to execute computer-executable instructions to realize the following steps: obtaining a code stream of a unit to be decoded;

determining a scanning manner and a grouping manner of the unit to be decoded, and a coding manner corresponding to each group; decoding according to the coding manner of each group to obtain one or more coefficient blocks corresponding to the unit to be decoded; and recovering one or more coefficients in each of the coefficient blocks in each group one by one according to the scanning manner of the unit to be decoded to obtain one or more reconstructed data blocks corresponding to the unit to be decoded.

For example, the processor 111 is configured to execute computer-executable instructions to realize the following steps: scanning one or more data blocks to be coded in an original image according to a first scanning manner to obtain a coefficient sequence; grouping the coefficient sequence according to a first grouping manner to obtain a plurality of groups of subsequences to be coded; and determining a coefficient coding manner corresponding to each of the plurality of groups of subsequences to be coded, and coding the subsequences to be coded one by one to obtain a coded code stream.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

Based on the foregoing descriptions of embodiments, a person skilled in the art may clearly understand that, for the purpose of convenient and brief description, division into the foregoing functional modules is used as an example for illustration. In actual application, the foregoing functions can be allocated to different modules and implemented based on a requirement, that is, an internal structure of an apparatus is divided into different functional modules to implement all or some of the functions described above. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or some of the operations of the methods described in embodiments of the present disclosure. The foregoing storage medium includes any medium that can store program code, such as a flash memory, a removable hard disk, a read-only memory, a random access memory, a magnetic disk, or an optical disc.

The foregoing descriptions are merely embodiments of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

The invention claimed is:

1. A video image decoding method, comprising:
obtaining a code stream of a unit to be decoded;
determining a scanning manner of the unit to be decoded;
parsing a grouping manner of the unit to be decoded according to the code stream;
decoding according to the code stream to obtain group parameters of each group, wherein the decoding according to the code stream to obtain the group parameters of each group comprises: according to sizes of coefficient values, decoding the code stream by combining a fixed-length code with a truncated unary code to obtain the group parameters of each group;
decoding according to the group parameters of each group to obtain a plurality of coefficient values in each group, wherein one or more coefficient blocks corresponding to the unit to be decoded comprise the plurality of coefficient values in each group, wherein the decoding according to the group parameters of each group to obtain the plurality of coefficient values in each group comprises: decoding according to the group parameters of each group by using a fixed-length code to obtain the plurality of coefficient values in each group; and recovering coefficients in the one or more coefficient blocks corresponding to the unit to be decoded according to the scanning manner of the unit to be decoded to obtain one or more reconstructed data blocks corresponding to the unit to be decoded.

2. The method according to claim 1, wherein the scanning manner comprises vertical scanning.

3. The method according to claim 1, wherein the grouping manner comprises a fixed-length grouping manner or a grouping division based on coefficient arrangement positions;

wherein the fixed-length grouping manner comprises: taking the whole unit to be coded as a group or taking every four coefficients in the whole unit to be decoded as a group;

the grouping division based on the coefficient arrangement positions comprises: coefficients in the whole unit to be coded being unevenly divided according to positions, or the coefficients in the whole unit to be coded being evenly divided according to positions.

4. A video image coding method, comprising:

scanning one or more data blocks to be coded in an original image according to a first scanning manner to obtain a coefficient sequence; wherein the first scanning manner comprises vertical scanning;

grouping the coefficient sequence according to a first grouping manner to obtain a plurality of groups of subsequences to be coded; wherein the first grouping manner comprises a fixed-length grouping manner or a grouping division based on coefficient arrangement positions; wherein the fixed-length grouping manner comprises: taking a whole data block to be coded as a group or taking every four coefficients in the whole data block to be decoded as a group; the grouping division based on the coefficient arrangement positions comprises: coefficients in the whole data block to be coded being unevenly divided according to positions, or the coefficients in the whole data block to be coded being evenly divided according to positions; and determining a coefficient coding manner corresponding to each of the plurality of groups of subsequences to be coded, and coding a plurality of coefficient values in each of the plurality of groups of subsequences to be coded one by one to obtain a coded code stream; wherein coding the plurality of coefficient values in each of the plurality of groups of subsequences to be coded according to group parameters of each of the plurality of groups of subsequences to be coded to obtain the coded code stream, comprising: according to the group parameters of each of the plurality of groups of subsequences to be coded, coding the plurality of coefficient values in each of the plurality of groups of subsequences to be coded by using a fixed-length code to obtain the coded code stream;

wherein coding the group parameters of each of the plurality of groups of subsequences to be coded, and the coded code stream comprises coded group parameters; wherein the coding the group parameters of each of the plurality of groups of subsequences to be coded comprises: according to sizes of coefficient values, coding the group parameters of each of the plurality of groups of subsequences to be coded by combining a fixed-length code with a truncated unary code.

5. An electronic device, comprising a processor and a memory, wherein the memory is configured to store computer instructions, and the processor is configured to call the computer instructions from the memory and run the computer instructions to implement the method according to claim 1.

6. An electronic device, comprising a processor and a memory, wherein the memory is configured to store computer instructions, and the processor is configured to call the computer instructions from the memory and run the computer instructions to implement the method according to claim 4.

7. A non-transitory computer-readable storage medium, storing a computer program or instructions thereon, wherein when the computer program or instructions is executed by an electronic device, the method according to claim 1 is implemented.

8. A non-transitory computer-readable storage medium, storing a computer program or instructions thereon, wherein when the computer program or instructions is executed by an electronic device, the method according to claim 4 is implemented.

* * * * *